US012625834B2

(12) United States Patent
Heimann et al.

(10) Patent No.: US 12,625,834 B2
(45) Date of Patent: May 12, 2026

(54) ANALOG CIRCUIT

(71) Applicant: ANABRID GMBH, Berlin (DE)

(72) Inventors: Lars Heimann, Berlin (DE); Bernd Ulmann, Bad Schwalbach (DE); Sven Köppel, Münster (DE)

(73) Assignee: ANABRID GMBH, Berlin (DE)

( * ) Notice: Subject to any disclaimer, the term of this patent is extended or adjusted under 35 U.S.C. 154(b) by 258 days.

(21) Appl. No.: 18/566,205

(22) PCT Filed: Jun. 11, 2021

(86) PCT No.: PCT/EP2021/065753
§ 371 (c)(1),
(2) Date: Dec. 1, 2023

(87) PCT Pub. No.: WO2022/258192
PCT Pub. Date: Dec. 15, 2022

(65) Prior Publication Data
US 2024/0289293 A1     Aug. 29, 2024

(51) Int. Cl.
*G06F 13/40*         (2006.01)

(52) U.S. Cl.
CPC ...... *G06F 13/4068* (2013.01); *G06F 2213/40* (2013.01)

(58) Field of Classification Search
CPC ............. G06F 13/4068; G06F 2213/40; G06F 13/4063; G06F 13/4004; G06F 13/40
See application file for complete search history.

(56) References Cited

U.S. PATENT DOCUMENTS 9,612,987 B2 * 4/2017 Sullam ................ G06F 13/4022
2006/0261846 A1 11/2006 Twigg et al.

FOREIGN PATENT DOCUMENTS

JP          2003085560 A     3/2003
WO          95/17781 A1      6/1995

OTHER PUBLICATIONS

Schlottmann et al. ; "A MITE-Based Translinear FPAA" ; IEEE Transactions on Very Large Scale Integration (VLSI) Systems, vol. 20, No. 1 ; Jan. 2012 ; XP011388927.
(Continued)

*Primary Examiner* — Idriss N Alrobaye
*Assistant Examiner* — Richard B Franklin
(74) *Attorney, Agent, or Firm* — SQUIRE PATTON BOGGS (US) LLP

(57)          ABSTRACT
There is provided an analog circuit comprising: a plurality of analog functions, which are divided into at least two groups of analog functions, and an interconnection structure configured to interconnect the plurality of analog functions so as to enable transfer of both voltage and current signals between analog functions among the plurality of analog functions. The interconnection structure comprises at least two hierarchy levels of interconnections, wherein a local-bus hierarchy level is configured to interconnect analog functions of a respective group, and a global-bus hierarchy level is configured to interconnect analog functions of the plurality of groups. The local-bus hierarchy level comprises voltage signal lines for transferring voltage signals and/or current signal lines for transferring current signals, and the global-bus hierarchy level comprises voltage signal lines for transferring voltage signals and/or current signal lines for transferring current signals.

13 Claims, 13 Drawing Sheets

Local bus          Global bus

(56)            References Cited

OTHER PUBLICATIONS

Schlottmann ; "A Coordinated Approach to Reconfigurable Analog Signal Processing" ; School of Electrical and Computer Engineering Georgia Institute of Technology ; Aug. 2012 ; XP055888976.

Varghese et al. ; "A Continuous-time Hierarchical Field Programmable Analogue Array for Rapid Prototyping and Hierarchical Approach to Analogue Systems Design" ; Proceedings 18th Symposium on Integrated Circuits and Systems Design, SBCCI 2005 ; Sep. 4, 2005 ; XP058144726.

Sun et al. ; "Cascaded Architecture for Memristor Crossbar Array Based Larger-Scale Neuromorphic Computing" ; IEEE Access, vol. 7 ; May 23, 2019 ; XP011726511.

International Search Report and Written Opinion dated Feb. 18, 2022 corresponding to International Patent Application No. PCT/EP2021/065753.

Decision to Grant a Patent dated Apr. 2, 2025, corresponding to Japanese Patent Application No. 2023-575710, with English translation thereof.

Notice of Reasons for Refusal dated Dec. 25, 2024, corresponding to Japanese Patent Application No. 2023-575710, with English translation thereof.

* cited by examiner dividing a plurality of analog functions into groups (grouping)

providing an interconnection structure to interconnect the plurality of analog functions

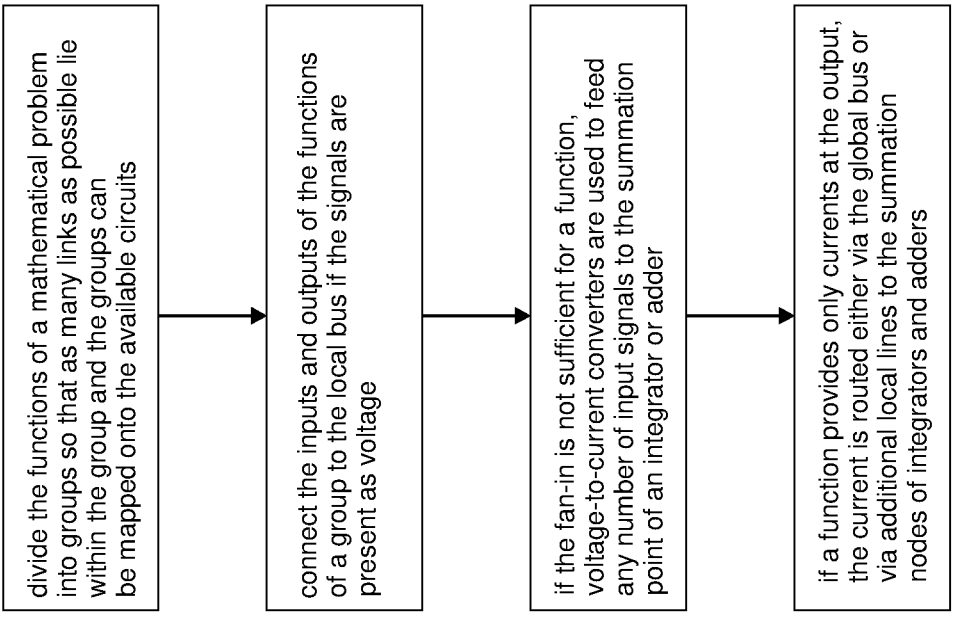

divide the functions of a mathematical problem into groups so that as many links as possible lie within the group and the groups can be mapped onto the available circuits connect the inputs and outputs of the functions of a group to the local bus if the signals are present as voltage if the fan-in is not sufficient for a function, voltage-to-current converters are used to feed any number of input signals to the summation point of an integrator or adder if a function provides only currents at the output, the current is routed either via the global bus or via additional local lines to the summation nodes of integrators and adders

Figure 13

ANALOG CIRCUIT

FIELD

The present disclosure relates to an analog circuit. More specifically, the present disclosure relates to (the design and the operation of) an analog circuit comprising a plurality of analog functions, particularly the interconnection of the plurality of analog functions.

BACKGROUND

Basically, the present disclosure relates to the interconnection of a plurality of analog functions of an analog circuit or, stated in other words, the signal transfer (or routing) between a plurality of analog functions of an analog circuit. In this regard, an analog circuit may refer to an analog or hybrid computer, an analog or hybrid arithmetic circuit, an analog or hybrid filter, an analog or hybrid signal conditioning system, or the like.

As discrete analog computers, integrated analog computers and digital Field Programmable Gate Arrays (FPGAs) are subject to similar challenges in terms of interconnection of or signal transfer (or routing) between components, an overview of conventional techniques for such circuits is given below.

In classic analog computers, the individual computing elements, such as integrators, multipliers, adders and other functions, are connected via a so-called patch panel. The patch panel is a matrix of sockets to which the inputs and outputs of the individual computing elements are connected, wherein the computing elements are interconnected via patch cables. The advantage of patch panels is that any element can be connected with any other element, and there is no restriction by a limited number of signal lines. The disadvantage of patch panels is that the interconnection has to be done manually, and for each new program, i.e. each mathematical problem to be solved by the analog computer, the interconnection has to be manually changed. Even with an exchangeable patch panel, where the program (in form of the interconnection of element) could thus be exchanged, the disadvantage of the need of manual implementation of the program remained.

Therefore, the patch panel was replaced with an electronic switching matrix. However, in such switching matrix, the extremely high number of switches is problematic. For example, if there are 100 arithmetic elements, a switching matrix of at least 100×100=10,000 switches is needed. Since a computing element typically has more than one input and one output, much more switches are typically required in practice. In addition to the high number of switches, parasitic capacitances in the signal lines and the switches themselves also represent disadvantages of such switching matrix. The number of switches can be reduced by designing the switching matrix with multiple stages. Such switching networks are called Clos networks, which were used early in communications engineering. The multistage Clos networks have fewer switches overall and can be designed so that each input node can always be connected to each output node. Network (i.e. circuit) overhead can be reduced, if it is possible to reconfigure the entire network when another connection is required. This is the case with analog computers because a new connection is equivalent to a new program, i.e. a new configuration. The effort can be reduced even further, if a small number of desired connections do not have to be implemented. While this is acceptable in telephone networks, it is not acceptable in analog computers.

Further, a Clos network has at least three stages, which is why there are at least three switches in series, which further reduces the signal bandwidth due to parasitic capacitances and, if transistors are used as switches, the bandwidth from a combination of capacitances and on-resistances of switches.

In Field Programmable Gate Arrays (FPGA), the interconnection of or signal transfer (or routing) between components, which are called Configurable Logic Blocks (CLBs), is designed so as to reduce the probability of blocking, to reduce the area used for signal lines (or routing channels) and overall signal transfer (or routing) effort, to reduce the ratio of parasitic capacitances in relation to the on-resistances of the transfer gates with the aim of reducing the propagation time and the phase shift, respectively, and to reduce dynamic power consumption. These requirements are realized by the concept of (the combination) local and global routing. More specifically, line segments with different lengths in relation to the arrangement of the logic blocks are used, such that there are shorter line segments for connecting only adjacent CLBs and there are longer line segments for connecting clusters of CLBs, wherein shorter and longer line segments lead to a partitioning of the routing into local and global routing. By dividing routing into local and global routing, adjusted line lengths and thus effort-optimized routing can be achieved.

FIG. 1 shows a schematic diagram illustrating a configuration for local and global routing in a conventional FPGA. As shown in FIG. 1, local interconnects are provided for local signal transfer (or routing) within a cluster (or group) of CLBs, and a global interconnect is provided for global signal transfer (or routing) between clusters (or groups) of CLBs. In any one of the local and global interconnects, the signal transfer (or routing) between corresponding CLBs is realized by respective switches on (crossing of) signal lines, as is schematically indicated by at least some black dots on the global interconnect (which are depicted for illustrative purposes).

The Configurable Logic Block (CLB) represents a rather general-purpose digital block that contains at least one look-up table or logic functions with multiplexers and an edge-controlled D-flip-flop. There are also CLBs that additionally contain full adders, additional flip-flops, clock gating and even a local feedback from the output of the flip-flop back to the logic inputs.

The universality of a CLB differs from the application problem in analog circuits, such as analog computers. The frequently used analog functions such as integrator, adder and multiplier differ in their circuit realization in such a way that a universal analog block would have too much circuit overhead and would have a sub-optimal performance due to the circuit overhead. Even if an integrator could be converted into an adder by replacing the capacitance in the negative feedback (loop) with a resistor, the integrator still has a circuit for setting the initial condition, which would be unused overhead in the adder. Moreover, a multiplier differs substantially with respect to its implementation from adders and integrators. Hence, the concept of local and global routing in a FPGA, as mentioned above, cannot be directly transferred to analog circuits, such as analog computers.

Nevertheless, an arrangement of analog functions in clusters (or groups) similar to the groups of CLBs in a FPGA, as shown in FIG. 1, makes sense. This is because in analog circuits the integrator as a core element is usually directly linked to adders or multipliers, and therefore a cluster (or group) formation with integrators, adders and multipliers seems reasonable.

In analog computers, similar challenges apply with the interconnection of the individual elements as in FPGAs, which are basically due to finite resources for routing such that not every element can be arbitrarily interconnected with any other element. Accordingly, in analog computers the problem of limited routing possibilities can also be solved by clustering (or grouping), while the term macro cell is typically used instead of cluster (or group).

FIG. 2 shows a schematic diagram illustrating a configuration of a macro cell in a conventional analog computer, and FIG. 3 shows a schematic diagram illustrating a configuration of an array of four macro cells in a conventional analog computer.

As is shown in FIG. 2, any analog function can be connected to any other analog function without creating a blockage. Each input of an analog function is permanently connected to a horizontal line. The outputs of the analog functions and the connections at the crossbars are set flexibly, which means that a connection is made with a switch such as a CMOS transfer gate. This is different from the crossbars in FPGAs because in FPGAs not only connections are made but also interruptions of the signal lines can be programmed at the crossing points or routing can be done at right angles.

To mitigate the problem of parasitic capacitances and errors due to on-resistances of the switches, currents are used as signals. Currents have the advantage that they can be summed directly at the input of an operational amplifier circuit, i.e. usage of current is beneficial with regard to fan-in. A disadvantage of currents, however, is that if an output signal has to be distributed to several inputs, current mirror circuits are required, i.e. usage of current is detrimental with regard to fan-out. In FIG. 2, functions $f_1(x)$ represent so-called fan-out circuits which have plural current outputs requiring current mirror circuits.

While it might be expected that the routing effort is lower if the analog functions were intermixed (because shorter routing distances would then be required on statistical average), this is barely possible because the functions $f_1(x)$, $f_2(x)$ and $f_3(x, y)$ are of different dimensions in physical layout. In addition, individual analog functions further require special signals such as reference voltages and bias currents, which requires additional interconnecting lines and therefore makes arbitrary arrangement of the functions difficult.

As shown in FIG. 3, the macro cells are interconnected at a higher hierarchy level. While within a macro cell all functions can be freely connected to each other, a non-blocking connection on the higher hierarchy level is not guaranteed.

For example, the upper left macro cell in FIG. 3 has the output line bundles m1 to m4, namely a total of 18 output lines for 16 function cells, which exit the macro cell at the bottom edge. It is to be noted that there are more output lines than function cells because the 8 functions on the left are smaller in area and are the fan-out functions for branching output signals. Hence, the 16 functions of a macro cell have a total of 20 inputs, since four functions have two inputs each. The input line bundles n1 to n4 are arranged on the right side of the macro cell. The inputs of the macro cell go to the vertical buses N of the array, while the outputs go to the horizontal buses M. When multiple macro cells are interconnected, it is not possible to provide an arbitrary number of buses so that any analog function of a macro cell can be interconnected with any analog function of any other macro cell. Hence, blocking may occur depending on the situation.

In the transfer or distribution (i.e. routing) of analog signals, current(-based) signals and voltage(-based) signals are conceivable. Stated in other words, current mode or voltage mode is conceivable for signal transfer (or routing) in analog circuits, such as analog computers.

When analog signals are distributed, static and dynamic errors must be considered. In case of voltage(-based) signal transfer (or routing), the on-resistances of switches, such as crossbar switches, which are in series with the input resistances of the analog functions, such as the integrators or adders, are critical. The switches need a small on-resistance, which results in a large gate area and thus higher parasitic capacitances. These capacitances, together with the finite output resistances of the circuits of the individual functions and the on-resistances of upstream switches, reduce the signal bandwidth. In case of current(-based) signal transfer (or routing), the voltage drop across switches does not matter, such that the switches can be made smaller.

For fan-out and fan-in, there are differences in voltage(-based) signal transfer (or routing) and current(-based) signal transfer (or routing) as well. In case of current(-based) signal transfer (or routing), the fan-in is simply done by connecting the signal lines, while special functions are needed for fan-out (e.g. $f_1(x)$ in FIG. 2). In case of voltage(-based) signal transfer (or routing), a number of resistors equal to the required fan-in must be provided at each analog function, and, if the fan-in is not sufficient, another adder stage must be connected in front of it.

FIG. 4 shows a circuit diagram of an implementation of an integrator for current mode operation in a conventional analog computer. It is noted that, although a fully differential circuit principle is applied in the integrator, FIG. 4 does not depict the fully differential circuit structure for the sake of simplicity.

As shown in FIG. 4, an integrator for current mode operation comprises a current input (i.e. a fan-in circuitry), a voltage-current conversion circuitry (i.e. a V-I converter) and a current output (i.e. a fan-out circuitry), wherein the fan-out circuitry is a circuit for copying the current if the output of the integrator has to be switched to several subsequent inputs. In this example, the fan-out circuitry has three current outputs, and plural fan-out circuitries have to be cascaded when a larger fan-out, i.e. a higher number of current outputs, is needed.

Conventionally, weighting the problems of fan-in and fan-out and bandwidth limitation due to the on-resistance of (crossbar) switches, analog signal transfer (or routing) in analog computers, such as the above-discussed designs/implementations, is typically accomplished by current(-based) signals. That is, analog signals are typically transferred or distributed as currents in analog computers, such as the above-discussed designs/implementations.

With regard to the integrator implementation of FIG. 4, representing an example of an implementation of an analog function in an analog circuit, usage of current(-based) signal transfer/routing exhibits the following properties.

As Regards Fan-In:

The input transistors at Vcn and Vcp should have a low input impedance, which is equivalent to a high transconductance $(g_m)$. This requires not only a short channel length, but also a significant current, which in combination with the matching error of the upper and lower current mirrors (denoted by X:Y in FIG. 4) leads to offset errors.

As Regards V-I Conversion:

Dynamically, the circuit has high stability because of the integration of the current on the capacitance (representing the summation point of the integrator) without a feedback loop, i.e. no integration capacitance is needed in the negative feedback of an OpAmp. However, the bandwidth is limited by the finite transconductance of the fan-in circuitry.

The OpAmp input node is, in a certain sense, decoupled from the external signal bus, which is advantageous in case of interfering signals.

With a duplicated current output from the transconductance amplifier, realized by matching current mirrors, the parasitic capacitances in the negative feedback loop are kept small, which is good for dynamic stability. However, an additional matching error of the current mirror must be considered/added.

Due to the fully differential circuit principle of the integrator, an additional transconductance amplifier is required for the common-mode regulation of the voltage at the integration capacitance (which is not shown in FIG. 4).

As Regards Fan-Out:

Matching errors between the upper and lower current mirrors (denoted by X:Y in FIG. 4) are critical in the fan-out circuitry. Therefore, current-steering DACs (digital-to-analog converters) are required for correction/compensation, such as 6-bit DACs (5 bits+sign). However, only the offset error can be corrected thereby, but not the gain error.

In discrete analog computers, potentiometers are used to precisely set scaling and factors. In integrated analog computers, digital potentiometers would be easy to realize, e.g. by R-2-R networks. In current mode, it is however difficult to realize appropriate coefficients for current-based signals. For example, in the implementation of FIG. 4, it is only possible to (commonly) adjust the coefficients for all output currents in the same manner, namely by changing the resistance of resistor $R_{V-I}$ in the V-I-conversion circuitry. For individually adjusting the coefficients for respective output currents, there is a multiplying DAC would be needed, which is a current-steering DAC whose current reference is used as a signal input. While current-steering DACs can be switched very instantaneously, the signal bandwidth is low when the current reference is being varied, and the area consumption is quite high.

From the above, it can be recognized that there is room for improvement for (the design and the operation of) an analog circuit comprising a plurality of analog functions, particularly the interconnection of the plurality of analog functions. In particular, there is room for improvement for the interconnection of a plurality of analog functions of an analog circuit or, stated in other words, the signal transfer (or routing) between a plurality of analog functions of an analog circuit.

SUMMARY

Various embodiments of the present disclosure aim at addressing at least part of the above issues and/or problems and drawbacks.

More specifically, it is an object of the present disclosure to provide an analog circuit, as well as an operating method and/or design method of an analog circuit, which provides for an efficient interconnection of or signal transfer (or routing) between a plurality of analog functions.

Various aspects of embodiments of the present disclosure are set out in the appended claims.

According to an exemplary aspect of the present disclosure, there is provided an analog circuit comprising: a plurality of analog functions, which are divided into at least two groups of analog functions, and an interconnection structure configured to interconnect the plurality of analog functions so as to enable transfer of both voltage and current signals between analog functions among the plurality of analog functions, wherein the interconnection structure comprises at least two hierarchy levels of interconnections, wherein a local-bus hierarchy level is configured to interconnect analog functions of a respective group, and a global-bus hierarchy level is configured to interconnect analog functions of the plurality of groups, the local-bus hierarchy level comprises voltage signal lines for transferring voltage signals and/or current signal lines for transferring current signals, and the global-bus hierarchy level comprises voltage signal lines for transferring voltage signals and/or current signal lines for transferring current signals.

In the above configuration, the local-bus hierarchy level may comprise at least one local bus for each group, which is configured to interconnect analog functions of the respective group, and the global-bus hierarchy level may comprise at least one global bus, which is configured to interconnect analog functions of the plurality of groups. If so, the at least one local bus for each group may comprise voltage signal lines for transferring voltage signals, and the at least one global bus may comprise current signal lines for transferring current signals. Then, the at least one local bus for at least one group may further comprise current signal lines for transferring current signals, and/or the at least one global bus may further comprise voltage signal lines for transferring voltage signals. Additionally or alternatively, any analog function may be connected to the local bus for its group and/or the at least one global bus.

In any of the above configurations, a current input or output of an analog function may be connected to a current signal line, and/or a voltage input or output of an analog function may be connected to a voltage signal line.

In any of the above configurations, a first analog function in a group, which is connected to a voltage signal line, and a second analog function in the group, which is connected to a current signal line, may be interconnected via a voltage-current converter or a current-voltage converter as a third analog function in the group.

In any of the above configurations, at least one group may comprise voltage-current converters as analog functions, which are configured to extend a fan-in property of an analog function in that current outputs of at least two voltage-current converters, the voltage inputs of which are connected to different voltage signal lines, are connected to a current signal line which is connected with a current input of the analog function, and/or extend a fan-out property of an analog function in that a voltage output of the analog function is connected to a voltage signal line which is connected to voltage inputs of at least two voltage-current converters, the current outputs of which are connected to different current signal lines.

In any of the above configurations, at least one group may comprise one or more voltage-current converters as analog functions, which are configured to extend a signal bandwidth and/or reduce influence of parasitic resistance in signal transfer in that one or more voltage signals are converted into one or more current signals and the one or more current signals are transferred via at least one global bus between analog functions of different groups.

In any of the above configurations, at least one group may comprise a voltage-current converter as analog functions, which is configured to compensate gain and/or offset errors of an analog function in that one or more adjustable resistors, such as one or more potentiometers, of the voltage-current converter are adjusted to calibrate an output signal of the analog function.

In any of the above configurations, at least one group may comprise a voltage-current converter as analog functions, which is configured to compensate parasitic resistance at a voltage input of an analog function in that a calibrated current signal and the calibrated current signal with reversed sign are transferred to current inputs of the analog function and an output signal of the analog function is adjusted to zero.

In any of the above configurations, the local-bus hierarchy level may comprise, for at least one group, at least a first local bus, which is configured to interconnect a set of analog functions of the respective group, and a second local bus, which is configured to interconnect another set of analog functions of the respective group. If so, the first local bus may comprise voltage signal lines for transferring voltage signals, and the second local bus may comprise current signal lines for transferring current signals.

In any of the above configurations, the interconnection structure may comprise at least a further hierarchy level of interconnections, wherein at least one intermediate-bus hierarchy level is configured to interconnect analog functions of a set of groups among the plurality of groups, the least one intermediate-bus hierarchy level comprises voltage signal lines for transferring voltage signals and/or current signal lines for transferring current signals. If so, a respective set of groups may comprise a number of groups, which are located adjacent or close to each other. Additionally or alternatively, the at least one intermediate-bus hierarchy level may comprise at least one intermediate bus for a set of groups, which is configured to interconnect analog functions of the respective set of groups. Additionally or alternatively the at least one intermediate-bus hierarchy level may comprise at least a first intermediate bus for a first set of groups, and a second intermediate bus for a first set of groups, the first set of groups comprises a smaller number of groups and/or groups which are located more adjacent or closer to each other as compared with the second set of groups, and the first intermediate bus comprises voltage signal lines for transferring voltage signals, and the second intermediate bus comprises current signal lines for transferring current signals.

In any of the above configurations, the analog functions may be divided into groups such that a number of links between analog functions in a group is optimized. If so, the plurality of analog functions may constitute a mathematical problem to be solved by the analog circuit.

In any of the above configurations, any one of the analog functions may be or comprise any one of an integrator, an adder, a multiplier, a voltage-current converter, a comparator, an exponential function, a logarithmic function, a configurable arbitrary function generator or a current-voltage converter.

In any of the above configurations, any one of the analog functions may comprise a functional component configured to realize a respective function, without comprising fan-in and/or fan-out circuitry.

In any of the above configurations, the analog circuit may be or be comprised in or is dedicated for any one of an analog computer, an analog arithmetic circuit, an analog filter or an analog signal conditioning system.

In any of the above configurations, the analog circuit may be or be comprised in or is dedicated for any one of a hybrid computer, a hybrid arithmetic circuit, a hybrid filter or a hybrid signal conditioning system.

In any of the above configurations, the analog circuit may be implemented as any one of an integrated circuit, such as a system-on-chip integration, a microchip or a microprocessor, or a discrete circuit.

With any one of the above configurations, it is possible to provide an analog circuit which provides for an efficient interconnection of or signal transfer (or routing) between a plurality of analog functions.

Further developments and/or modifications of the aforementioned exemplary aspects of the present disclosure are set out in the following.

BRIEF DESCRIPTION OF THE DRAWINGS

In the following, the present disclosure will be described in greater detail by way of non-limiting examples with reference to the accompanying drawings, in which FIG. 13 shows a flowchart illustrating an example of a method for designing an analog circuit according to an embodiment.

DETAILED DESCRIPTION

Figure 1:
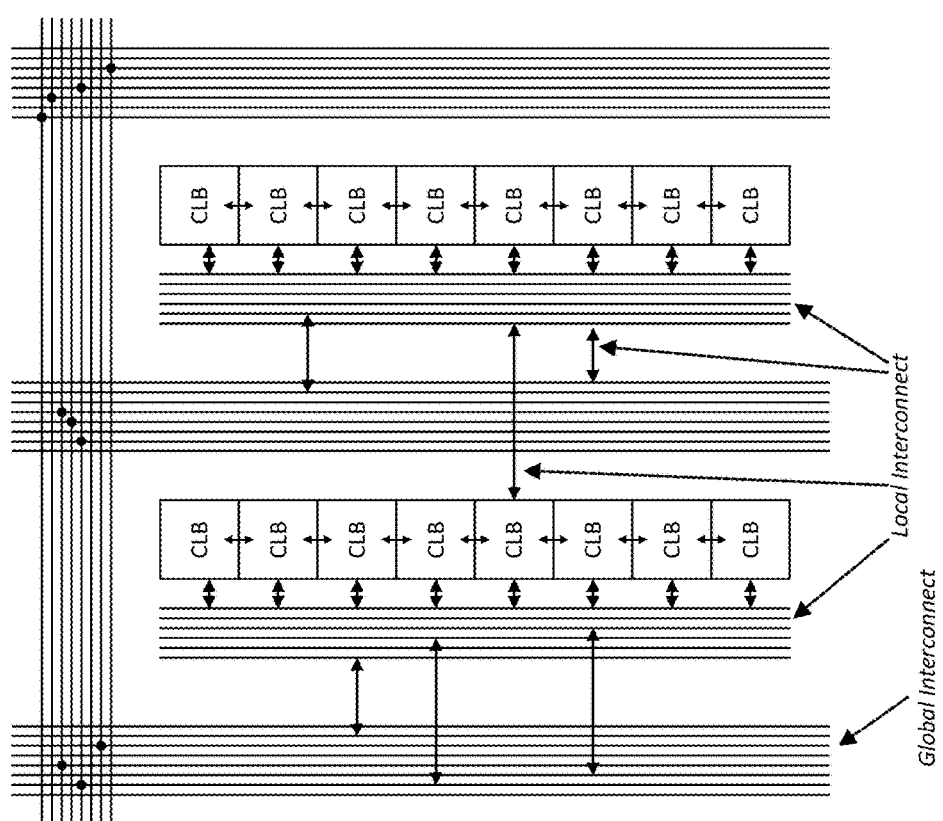
FIG. 1 shows a schematic diagram illustrating a configuration for local and global routing in a conventional FPGA.
Figure 2:
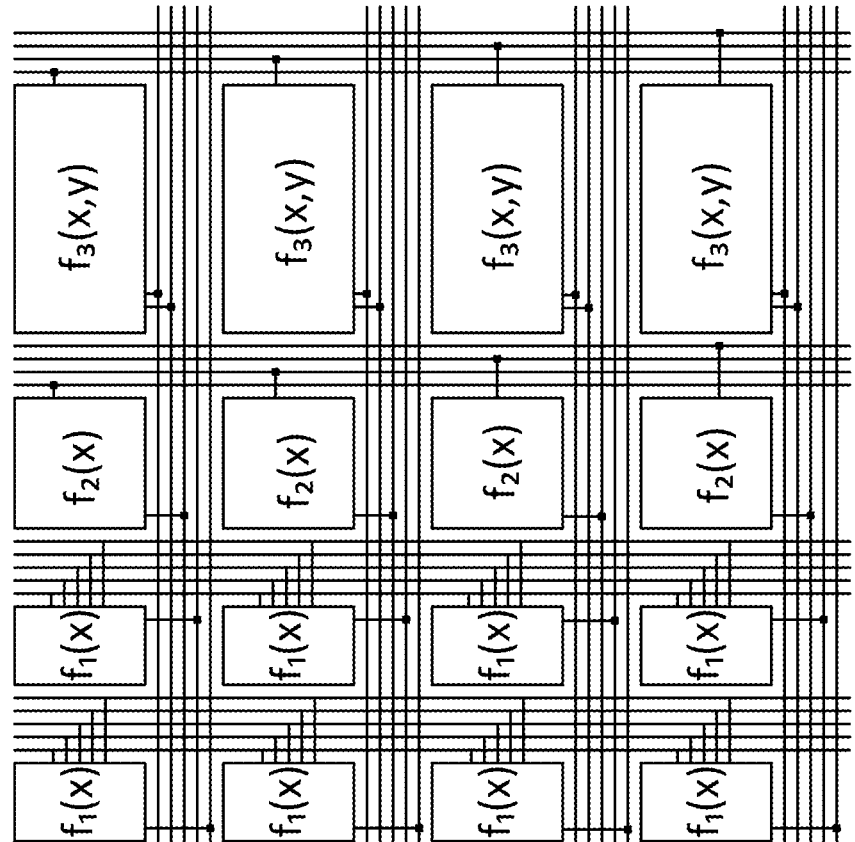
FIG. 2 shows a schematic diagram illustrating a configuration of a macro cell in a conventional analog computer.
Figure 3:
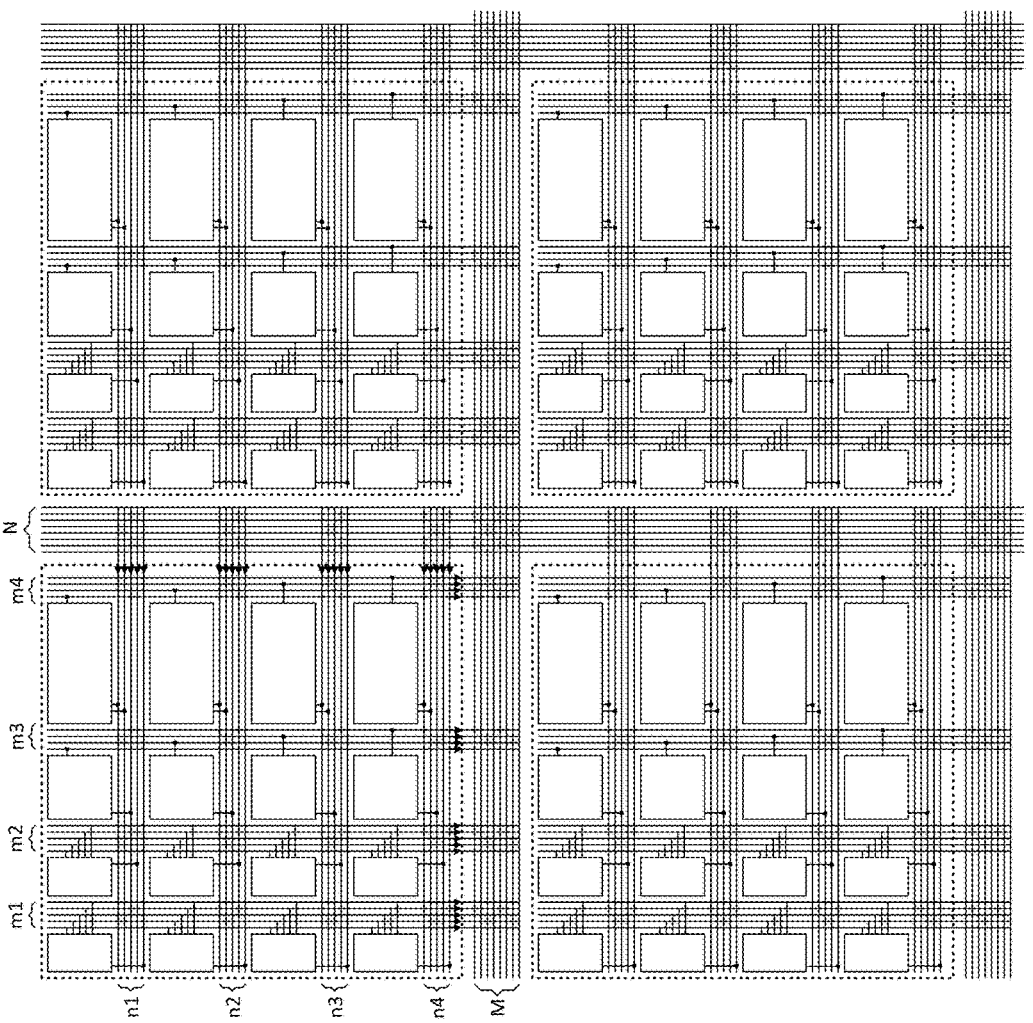
FIG. 3 shows a schematic diagram illustrating a configuration of an array of four macro cells in a conventional analog computer.

The present disclosure is described herein with reference to particular non-limiting examples and to what are presently considered to be conceivable (examples of) embodiments. A person skilled in the art will appreciate that the present disclosure is by no means limited to these examples and embodiments, and may be more broadly applied.

It is to be noted that the following description mainly refers to specifications being used as non-limiting examples and embodiments for certain exemplifying circuit structures, implementations and technologies. Such description is only used in the context of the presented non-limiting examples and embodiments, and does not limit the present disclosure in any way. Rather, any other circuit structures, implementations and technologies may equally be utilized as long as complying with what is described herein and/or embodiments described herein are applicable thereto.

Hereinafter, various examples and embodiments of the present disclosure and its aspects are described using several variants and/or alternatives. It is generally to be noted that, according to certain needs and constraints, all of the described variants and/or alternatives may be provided alone or in any conceivable combination (also including combinations of individual features of the various variants and/or alternatives). In this description, the words "comprising" and "including" should be understood as not limiting the described examples and embodiments to consist of only those features that have been mentioned, and such examples and embodiments may also contain structures, units, modules, networks, etc. that have not been specifically mentioned.

In the drawings, it is to be noted that lines/arrows interconnecting individual blocks or entities are generally meant to illustrate an operational coupling there-between, which may be a physical and/or logical coupling, which on the one hand is implementation-independent and on the other hand may also comprise an arbitrary number of intermediary functional blocks or entities not shown.

According to embodiments of the present disclosure, in general terms, there is provided an analog circuit, as well as an operating method and/or design method of an analog circuit, which provides for an efficient interconnection of or signal transfer (or routing) between a plurality of analog functions. In the present disclosure, an analog function may be or comprise any analog function, such as an integrator, an adder (including a subtracter), a multiplier, a voltage-current (V-I) converter, a current-voltage (I-V) converter, a comparator, an exponential function, a logarithmic function, a configurable arbitrary function generator, or the like.

Herein, an analog circuit may refer to an analog or hybrid computer, an analog or hybrid arithmetic circuit, an analog or hybrid filter, an analog or hybrid signal conditioning system, or the like. More specifically, an analog circuit according to the present disclosure may be or be comprised in or be dedicated for an analog computer, an analog arithmetic circuit, an analog filter, an analog signal conditioning system, or the like. Alternatively, an analog circuit according to the present disclosure may be or be comprised in or be dedicated for a hybrid computer, a hybrid arithmetic circuit, a hybrid filter, a hybrid signal conditioning system, or the like (wherein the term "hybrid" shall refer a combination/mixture of analog and digital implementation or technology). Hence, the present disclosure encompasses an analog or hybrid computer, an analog or hybrid arithmetic circuit, an analog or hybrid filter, an analog or hybrid signal conditioning system, or the like, in or by which an analog circuit, as is disclosed herein, is included.

Also, an analog circuit according to the present disclosure may be implemented in any way, e.g. as an integrated circuit, such as a system-on-chip integration, a microchip or a microprocessor, or a discrete circuit. Hence, the present disclosure encompasses an integrated circuit, a system-on-chip integration, a microchip, a microprocessor, a discrete circuit, or the like, in or by which an analog circuit, as is disclosed herein, is implemented.

Further, in the present specification, a bus shall refer to any medium capable of transmitting/transferring any kind of signal. More specifically, a bus may refer to a shared transmission medium which enables signal transmission/transfer between different components, depending on the configuration, operation or control.

According to the present disclosure and/or embodiments thereof, an analog circuit comprises a plurality of analog functions, which are divided into at least two groups of analog functions, and an interconnection structure configured to interconnect the plurality of analog functions so as to enable transfer of both voltage and current signals between analog functions among the plurality of analog functions. The interconnection structure comprises at least two hierarchy levels of interconnections, wherein a local-bus hierarchy level is configured to interconnect analog functions of a respective group, and a global-bus hierarchy level is configured to interconnect analog functions of the plurality of groups. The local-bus hierarchy level comprises voltage signal lines for transferring voltage signals and/or current signal lines for transferring current signals, and the global-bus hierarchy level comprises voltage signal lines for transferring voltage signals and/or current signal lines for transferring current signals.

Accordingly, the analog circuit according to the present disclosure and/or embodiments thereof provides for (the combination of) local and global routing, wherein different (types of) signals, namely voltage and current signals, can be used/transferred for local and global routing. Thereby, the advantages of the respective methods of signal transfer (or routing), namely the advantages of current mode and voltage mode operations, can be beneficially combined, as is explained in further detail below.

In an exemplary variant of an analog circuit according to the present disclosure and/or embodiments thereof, the local-bus hierarchy level is configured to transfer voltage signals by/via one or more voltage signal lines, i.e. local routing is voltage-based, and the global-bus hierarchy level is configured to transfer current signals by/via one or more current signal lines, i.e. global routing is current-based.

In an exemplary variant of an analog circuit according to the present disclosure and/or embodiments thereof, the local-bus hierarchy level is configured to transfer voltage signals by/via one or more voltage signal lines and to transfer current signals by/via one or more current signal lines, i.e. local routing is both voltage- and current-based (such as preferably voltage-based while additionally being current-based), and/or the global-bus hierarchy level is configured to transfer current signals by/via one or more current signal lines and to transfer voltage signals by/via one or more voltage signal lines, i.e. global routing is both current- and voltage-based (such as preferably current-based while additionally being voltage-based).

In an exemplary variant of an analog circuit according to the present disclosure and/or embodiments thereof, the interconnection structure comprises at least a further hierarchy level of interconnections, wherein at least one intermediate-bus hierarchy level is configured to interconnect analog functions of a set of groups among the plurality of groups. The at least one intermediate-bus hierarchy level comprises voltage signal lines for transferring voltage signals and/or current signal lines for transferring current signals. Namely, irrespective of (the routing on) the local-bus hierarchy level and the global-bus hierarchy level, any intermediate-bus hierarchy level is configured to transfer voltage signals by/via one or more voltage signal lines and/or to transfer current signals by/via one or more current signal lines, i.e. intermediate routing is voltage- and/or current-based.

While the description of examples and embodiments of the present disclosure mainly refers to an analog computer as an analog circuit, this is for illustrative and explanatory purposes only, and does not limit the scope of applicability. Namely, all features and properties exemplified by an analog computer are equally applicable for any kind of analog circuit, if feasible, unless stated otherwise.

With reference to FIGS. 5 to 9, various examples and embodiments regarding an analog circuit comprising two hierarchy levels of interconnections, namely a local-bus hierarchy level and a global-bus hierarchy level, are disclosed.

Figure 5:
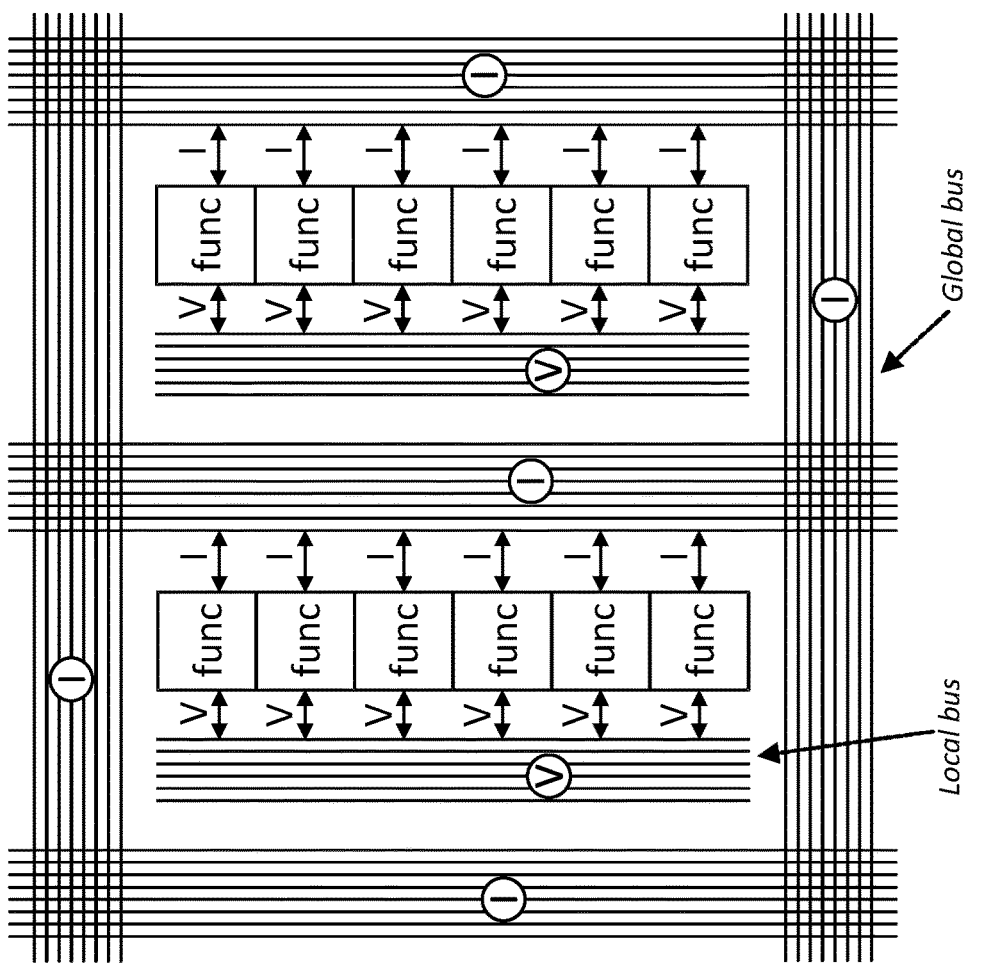
FIG. 5 shows a schematic diagram illustrating an example of a configuration for local and global routing in an analog circuit according to an embodiment.

FIG. 5 shows a schematic diagram illustrating an example of a configuration for local and global routing in an analog circuit according to an embodiment.

As shown in FIG. 5, the analog circuit according to the embodiment comprises a plurality of analog functions (denoted by "func"), which are divided into at least two groups of analog functions (i.e. two groups are exemplarily illustrated by respective vertical arrangements of function blocks), and an interconnection structure configured to interconnect the plurality of analog functions. As mentioned above, any one of the analog functions may be or comprise any analog function, such as an integrator, an adder (including a subtracter), a multiplier, a voltage-current (V-I) converter, a current-voltage (I-V) converter, a comparator, an exponential function, a logarithmic function, a configurable arbitrary function generator, or the like. It is to be noted that the analog functions which are grouped do not have to be arranged linearly, but can also be arranged differently, e.g. according to the shape, size, dimensions, etc. of the physical layout of the circuit of the respective functions, or the like.

According to the embodiment, the local-bus hierarchy level comprises at least one local bus for each group, which is configured to interconnect analog functions of the respective group, and the global-bus hierarchy level comprises at least one global bus, which is configured to interconnect analog functions of the plurality of groups. Any analog function may be connected to the at least one local bus for its group and/or the at least one global bus. Irrespective of the exemplary illustration in FIG. 5, depending on (the type and/or requirements of) a respective analog function, they may be connected to the local bus, the global bus or both the local and global buses, respectively.

It is to be noted that no switches, such as crossbar switches, are illustrated in/for the interconnection structure in FIG. 5. However, it is deemed to be evident for the person skilled in the art that, how and where such switches are provided so as to enable an appropriate/required signal transfer (or routing) between the analog functions. Specifically, corresponding switches are provided for voltage (V) connections of (corresponding inputs/outputs) of respective analog functions with voltage lines of respective buses (as indicated by arrows being marked with "V"), current (I) connections of (corresponding inputs/outputs) of respective analog functions with current lines of respective buses (as indicated by arrows being marked with "I"), and at crossings of corresponding signal lines of respective buses, respectively. For example, it is deemed to be self-evident that connections at the crossbars are connecting vertical current bus (lines) with horizontal current bus (lines).

According to the embodiment, the interconnection structure comprises a local bus (i.e. local interconnect) for each group, which is configured to interconnect analog functions of the respective group, and a global bus (i.e. global interconnect), which is configured to interconnect analog functions of the plurality of groups. Namely, the local buses are provided/configured for (enabling) local routing of signals between analog functions of a respective group, and the global bus is provided/configured for (enabling) global routing of signals between analog functions of different groups. Hence, the interconnection between the analog functions of the analog circuit is structured on two hierarchy levels, the local buses representing a first/lower hierarchy level and the global bus representing a second/higher hierarchy level. Any one of the local buses and the global bus comprises an appropriate number of signal lines, e.g. according to the number of analog functions, their grouping, the routing requirements, or the like.

According to the embodiment, the local bus for each group comprises voltage signal lines for transferring voltage signals, i.e. lines (dedicated) for carrying voltage(-based) signals or simply voltages, as is denoted by "V" on respective buses/lines, and the at least one global bus comprises current signal lines for transferring current signals, i.e. lines (dedicated) for carrying current(-based) signals or simply currents, as is denoted by "I" on respective buses/lines.

Accordingly, the analog circuit according to the embodiment provides for (the combination of) local and global routing, wherein local routing is voltage-based and global routing is current-based. Thereby, the advantages of the respective methods of signal transfer (or routing), namely the advantages of current mode and voltage mode operations, can be beneficially combined, as is explained in further detail below.

However, as is shown below, the present disclosure is not limited to a structure/configuration in which local routing, i.e. any local bus, is purely voltage-based and global routing, i.e. any global bus, is purely current-based.

Although FIG. 5 exemplarily shows a single local bus for each group, the local-bus hierarchy level may comprise more than one local bus for at least one group. For example, the local-bus hierarchy level may comprise, for at least one group, at least a first local bus, which is configured to interconnect a set of analog functions of the respective group, and a second local bus, which is configured to interconnect another set of analog functions of the respective group. If so, for example, the first local bus may be configured to transfer voltage signals by/via one or more voltage signal lines, and the second local bus may be configured to transfer current signals by/via one or more current signal lines.

Figure 6:
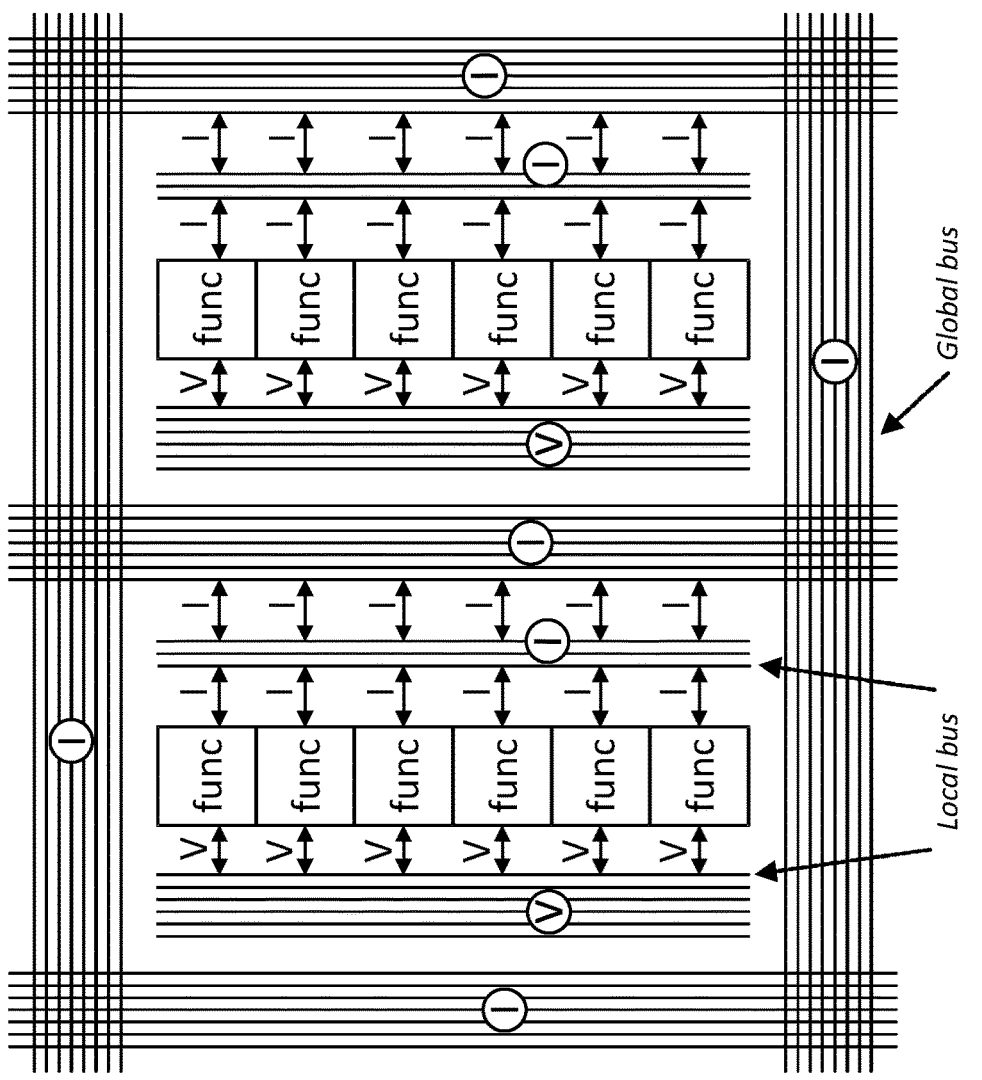
FIG. 6 shows a schematic diagram illustrating an example of a configuration for local and global routing in an analog circuit according to an embodiment.

FIG. 6 shows a schematic diagram illustrating an example of a configuration for local and global routing in an analog circuit according to an embodiment.

As shown in FIG. 6, the analog circuit according to the embodiment has the same basic structure/configuration as shown in FIG. 5. Hence, reference is made to the description of FIG. 5 for the basic structure/configuration, while the difference is described below. Similar to FIG. 5, it is deemed to be self-evident that connections at the crossbars are connecting vertical current bus (lines) with horizontal current bus (lines).

According to the embodiment, the local bus for at least one group further comprises current signal lines for transferring current signals. As shown in FIG. 6, the local buses each comprise, in addition to the voltage signal lines for transferring voltage signals (denoted by "V"), current signal lines for transferring current signals (denoted by "I"). Hence, the local buses comprise a combination/mixture of one or more lines (dedicated) for carrying current(-based) signals or simply currents and one or more lines (dedicated) for carrying voltage(-based) signals or simply voltages.

Such an interconnection structure, enabling voltage/current-combined local routing, is useful/beneficial (in/for any group) if there are several multipliers or other analog functions with current output in the group. Namely, it can thereby be avoided that signal transfer (or routing) between such analog functions in the group has to detour over the at least one global bus, thus saving signal lines on the at least one global bus.

By providing/enabling, in addition to an interconnection of analog functions within a group by voltages, an interconnection by currents as an additional way for distribution of signals, various benefits can be achieved. For example, the effort for the connection of analog functions which naturally have a current output can be reduced. For example, the parallel processing of voltages and currents at the input of an analog function allows to calibrate out the parasitic resistance of switches.

Accordingly, the analog circuit according to the embodiment provides for (the combination) local and global routing, wherein local routing is voltage- and/or current-based and global routing is current-based. Thereby, the advantages of the respective methods of signal transfer (or routing), namely the advantages of current mode and voltage mode operations, can be even more beneficially combined, as is explained in further detail below.

Figure 7:
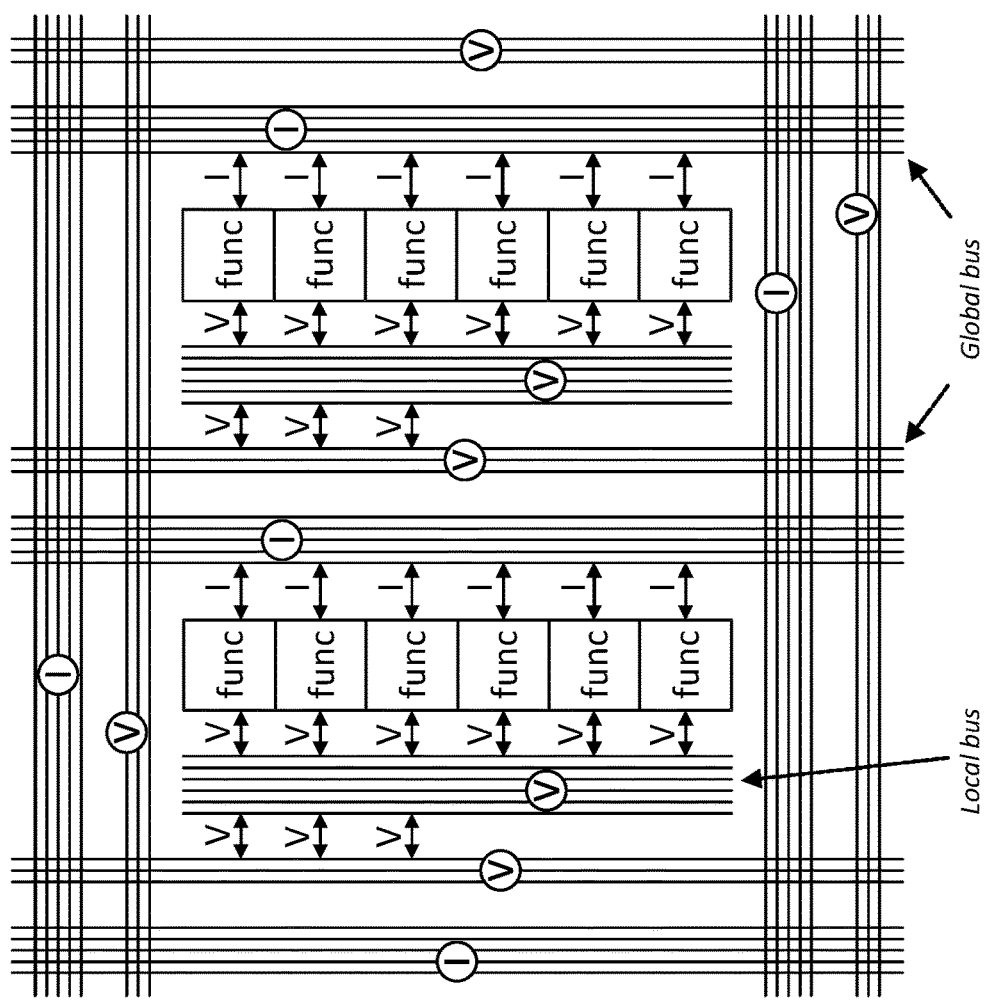
FIG. 7 shows a schematic diagram illustrating an example of a configuration for local and global routing in an analog circuit according to an embodiment.

FIG. 7 shows a schematic diagram illustrating an example of a configuration for local and global routing in an analog circuit according to an embodiment.

As shown in FIG. 7, the analog circuit according to the embodiment has the same basic structure/configuration as shown in FIG. 5. Hence, reference is made to the description of FIG. 5 for the basic structure/configuration, while the difference is described below. Similar to FIG. 5, it is deemed to be self-evident that connections at the crossbars are connecting vertical current bus (lines) with horizontal current bus (lines) and vertical voltage bus (lines) with horizontal voltage bus (lines).

According to the embodiment, the at least one global bus further comprises voltage signal lines for transferring voltage signals. As shown in FIG. 7, the global buses each comprise, in addition to the current signal lines for transferring current signals (denoted by "I"), voltage signal lines for transferring voltage signals (denoted by "V"). Hence, the global buses comprise a combination/mixture of one or more lines (dedicated) for carrying voltage(-based) signals or simply voltages and one or more lines (dedicated) for carrying current(-based) signals or simply currents.

Such an interconnection structure, enabling current/voltage-combined global routing, is useful/beneficial if the input resistance of the connected analog functions is high, e.g. in the case of an instrumentation amplifier, or if reference voltages have to be simultaneously distributed to several locations for initial conditioning of integrators or for individual calibration or general calibration of the system after power-up, or the like. Namely, the number of thus required signal lines can be reduced, and a more efficient operation is enabled.

By providing/enabling, in addition to an interconnection of analog functions between different groups (i.e. analog functions of a subordinate hierarchical level) by currents (on a superordinate hierarchy level), an interconnection by voltages as an additional way for distribution of signals, various benefits can be achieved. For example, it is possible calibrate errors in the case of high-impedance inputs or in the case of low dynamic requirements.

Accordingly, the analog circuit according to the embodiment provides for (the combination of) local and global routing, wherein local routing is voltage- and global routing is current- and/or voltage-based. Thereby, the advantages of the respective methods of signal transfer (or routing), namely the advantages of current mode and voltage mode operations, can be even more beneficially combined, as is explained in further detail below.

According to an embodiment, the structures/configurations of FIGS. 6 and 7 can be combined. Hence, an analog circuit according to an embodiment may comprise an interconnection structure, in which the local bus for at least one group further comprises current signal lines for transferring current signals (as shown in FIG. 6), and the at least one global bus further comprises voltage signal lines for transferring voltage signals (as shown in FIG. 7). Thus, the respective benefits of these structures/configurations can be combined accordingly.

Figure 8:
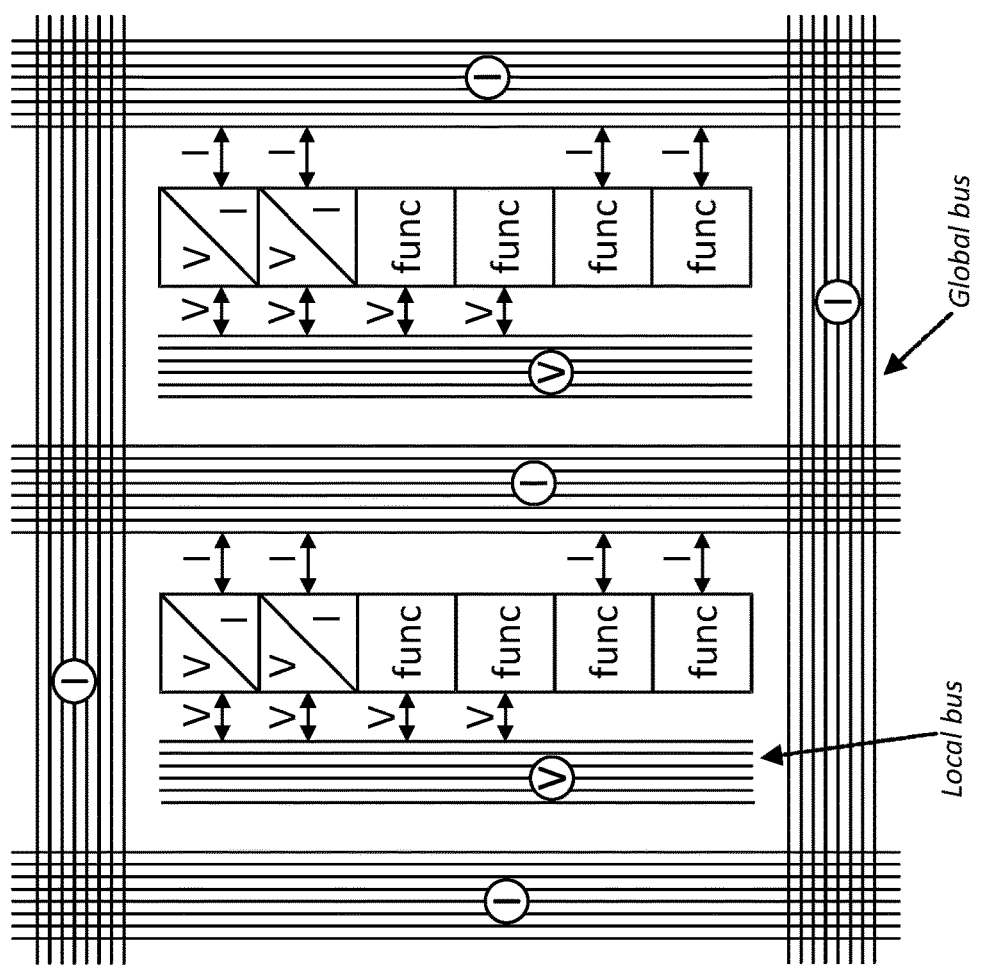
FIG. 8 shows a schematic diagram illustrating an example of a configuration for local and global routing in an analog circuit according to an embodiment.

FIG. 8 shows a schematic diagram illustrating an example of a configuration for local and global routing in an analog circuit according to an embodiment.

As shown in FIG. 8, the analog circuit according to the embodiment has the same basic structure/configuration as shown in FIG. 5. Hence, reference is made to the description of FIG. 5 for the basic structure/configuration, while the difference is described below. Similar to FIG. 5, it is deemed to be self-evident that connections at the crossbars are connecting vertical current bus (lines) with horizontal current bus (lines).

According to the embodiment, each analog function is connected to the local bus for its group and/or the at least one global bus. As shown in FIG. 8, as an example, in each group, two functions are connected to the local bus of their group only, two functions are connected to a global bus only, and two functions denoted by V/I are connected to both the local bus of their group and a global bus. As a matter of course, the structures/configurations of different groups do not need to be the same.

Hence, the analog functions do not have to be connected to the local voltage bus and to the global current bus at the same time but can also be connected to the local voltage bus or to the global current bus, respectively. Then, analog functions of a group, which are connected to the local voltage bus, and analog functions of the group, which are connected to the global current bus, can be interconnected via one or more current-voltage converters or current-voltage converters (which are connected between the local voltage bus and the global current bus).

Such interconnection is equally applicable in the structures/configurations of FIGS. 6 and/or 7. For example, referring to FIG. 6, analog functions of a group, which are connected to the local voltage bus (i.e. one or more voltage lines of the local bus for the group), and analog functions of the group, which are connected to the local current bus (i.e. one or more current lines of the local bus for the group), can be interconnected via one or more current-voltage converters or current-voltage converters (which are connected between the local voltage bus and the local current bus).

As is deemed to be evident for the person skilled in the art, either a voltage-current converter or a current-voltage converter is applicable in such interconnection depending on the characteristics of the inputs and outputs of the thus interconnected analog functions. Namely, the interconnection is accomplished via a voltage-current converter when the output of the analog function on the one side is a voltage output and the input of the analog function on the other side (which may be the same as the analog function on the one side) is a current input, while the interconnection is accomplished via a current-voltage converter when the output of the analog function on the one side is a current output and the input of the analog function on the other side (which may be the same as the analog function on the one side) is a voltage input.

Accordingly, a first analog function in a group, which is connected to a voltage signal line, and a second analog function in the group, which is connected to a current signal line, can be interconnected via a voltage-current converter or a current-voltage converter as a third analog function in the group.

However, even though not shown in FIG. 8, there may also be one or more analog functions ("func") in at least one group, which is connected to both the local bus of their group and the global bus.

According to various embodiments, a current input or output of an analog function can be connected to a current signal line, and/or a voltage input or output of an analog function can be connected to a voltage signal line. Namely, the inputs and outputs of an analog function can belong/ relate to the same electrical signals or can belong/relate to different electrical signals. For example, as is evident e.g. from FIG. 9, a multiplier can have voltage inputs and current output, while an integrator or an adder can have either or both of voltage and current inputs and a voltage output.

Figure 9:
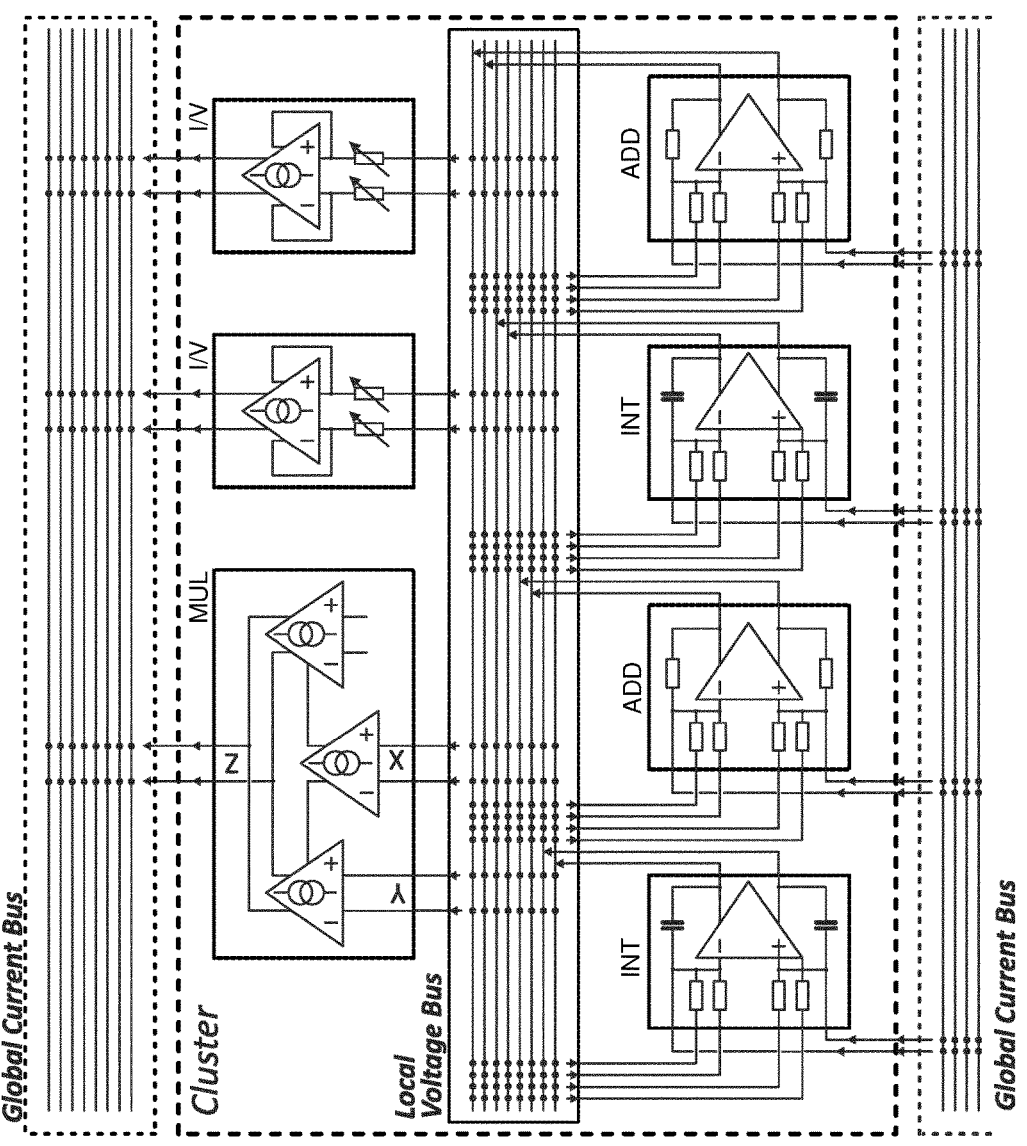
FIG. 9 shows a circuit diagram of an example of an implementation of a cluster of an analog circuit according to an embodiment.

FIG. 9 shows a circuit diagram of an example of an implementation of a cluster of an analog circuit according to an embodiment.

In FIG. 9, an exemplary implementation of/for the combined voltage- and current-based signal transfer (or routing) on two hierarchy levels of the analog circuit according to the embodiment is shown for a cluster basically corresponding to a group of analog functions, as shown in any one of FIGS. 5 to 8.

As evident from FIG. 9, the local routing is realized voltage-based via (the interconnection by) the local voltage bus, and the global routing is realized current-based via (the interconnection by) the global current bus, which basically corresponds to the structure/interconnection of FIG. 5. Thereby, respective advantages can be combined. Namely, voltage-based coupling is technically easier to implement, but is limited in terms of fan-in property, while current-based coupling requires a V-I converter at the output of an analog function with a voltage output, such as an integrator, but parasitic resistances of the switches are not relevant for current-based coupling (contrary to voltage-based coupling).

In the exemplary implementation of FIG. 9, two integrators (denoted by "INT") and two adders (denoted by "ADD") are shown in the lower part, and a multiplier (denoted by "MUL") and two V-I converters (denoted by "I/V") are shown in the upper part, while all of these analog functions are interconnected via (the interconnection by) the local voltage bus and the global current bus. The two integrators and the two adders have a differential voltage output which is switched to the local voltage bus. In principle, all integrators and adders can be interconnected in any way as long as the fan-in, 2 in this example, is sufficient. The multiplier has a current output. Therefore, just like the V-I converters, the multiplier is not connected to the local voltage bus on the output side, but to the global current bus.

The multiplier, just like the V-I converters, can be connected to the summation node of any one of the integrators and/or the adders via a path of the global routing channel, i.e. the global current bus. Any one of the integrators and/or the adders can be connected to any one of the multiplier and/or V-I converters via a path of the local routing channel, i.e. the local voltage bus.

In the exemplary implementation of FIG. 9, the V-I converters have various tasks or functionalities/operations, which are explained below.

Firstly, they can extend the limited fan-in of e.g. the integrators and/or the adders by using their internal summation node by converting the signals into currents, thus realizing an arbitrary fan-in for the respective integrator or adder. Additionally or alternatively, they can extend the limited fan-out (of the integrators and/or the adders) by using inputs of plural V-I converters for their voltage output, thus realizing an arbitrary fan-out for the respective integrator or adder. Hence, in the respective analog function, e.g. the integrator or adder, only a minimum or small maximum fan-in and or fan-out property needs to be provided/realized in/by (the circuitry of) the respective analog function.

Accordingly, when a group comprises voltage-current converters as analog functions, these can be configured to extend a fan-in property of an analog function in that current outputs of at least two voltage-current converters, the voltage inputs of which are connected to different voltage signal lines, are connected to a current signal line which is connected with a current input of the analog function (i.e. they can connect the current outputs to the current signal line which is connected with the current input of the analog function), and/or extend a fan-out property of an analog function in that a voltage output of the analog function is connected to a voltage signal line which is connected to voltage inputs of at least two voltage-current converters, the current outputs of which are connected to different current signal lines (i.e. they can connect the voltage output of the analog function to a voltage signal line which is connected to voltage inputs of the at least two voltage-current converters).

Secondly, they can convert voltage signals into currents and distribute them across any number of switches on the global current bus without the voltage drop across the on-resistances (of switches being turned on) being detrimental. That is, they can convert voltages of analog functions into currents that can be distributed between groups of analog functions via multiple switches at a higher hierarchical level without the detrimental influence of parasitic resistors or resistances.

Accordingly, when a group comprises one or more voltage-current converters as analog functions, these can be configured to extend a signal bandwidth and/or reduce influence of parasitic resistance in signal transfer in that one or more voltage signals are converted into one or more current signals and the one or more current signals are transferred via the at least one global bus between analog functions of different groups (i.e. they can convert the one or more voltage signals into the one or more current signals and transfer the one or more current signals via the at least one global bus).

Thirdly, they can realize finely graded coefficients, which would require a high effort in a pure current mode operation. That is, they can use adjustable resistors, such as (digital finely divided) potentiometers, to realize coefficients for current-based signals.

Accordingly, when a group comprises a voltage-current converter as analog functions, this can be configured to compensate gain and/or offset errors of an analog function in that one or more adjustable resistors, such as one or more potentiometers, of the voltage-current converter are adjusted to calibrate an output signal of the analog function (i.e. it can adjust one or more adjustable resistors to calibrate the output signal of the analog function).

Fourthly, they can calibrate the parasitic resistance at the respective voltage input by parallel processing of currents and voltages at an analog function. That is, by feeding a calibrated current signal in parallel into the summation point of an integrator or an adder and simultaneously feeding the same signal with reversed sign into the integrator or the adder, the error due to the parasitic resistance of the switches in series to the input resistances of the integrator or the adder can be compensated out.

Accordingly, when a group comprises a voltage-current converter as analog functions, this can be configured to compensate parasitic resistance at a voltage input of an analog function in that a calibrated current signal and the calibrated current signal with reversed sign are transferred to current inputs of the analog function and an output signal of the analog function is adjusted to zero (i.e. it can transfer a calibrated current signal and the calibrated current signal with reversed sign to the current inputs of the analog function and the output signal of the analog function can be adjusted to zero).

In the following, explanations are given with regard to (the combination) local and global routing, wherein local routing is (primarily) voltage-based and global routing is (primarily) current-based, i.e. the advantages of the respective methods of signal transfer (or routing), namely the advantages of current mode and voltage mode operations, and their combination according to the present disclosure.

As regards a comparison of an interconnection or a signal transfer (or routing) in voltage mode and current mode with respect to fan-in/out properties, the following considerations and findings underlie the above-described embodiments.

Figure 4:
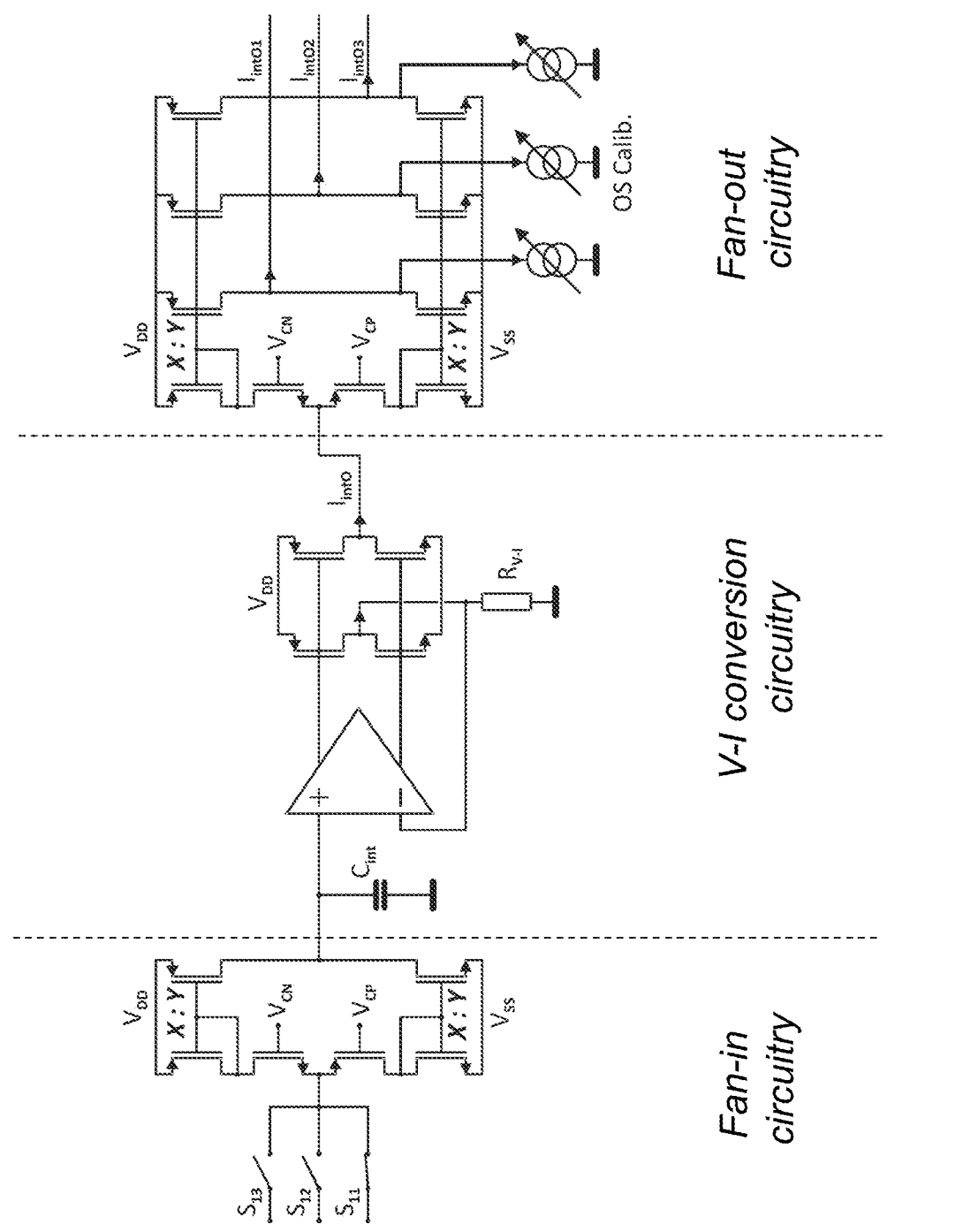
FIG. 4 shows a circuit diagram of an implementation of an integrator for current mode operation in a conventional analog computer.

Considering the integrator as a main component of an analog computer, it is to be noted that integration at the capacitance primarily produces a voltage. For current signal transfer (or routing), this voltage must be converted into currents. Such conversion can be accomplished in different ways. On the one hand, an integrator can be used, which stores the voltage in logarithmically compressed form. When a logarithmically compressed voltage is converted to a current using the exponential function of a bipolar transistor or a MOSFET in weak inversion, a current is implicitly generated. On the other hand, a circuit structure of an integrator, as shown in FIG. 4, can be used. Therein, the currents are first directed to the integration capacitance by means of a cascode and a current mirror. For the integration itself, no operational amplifier with capacitance is required in the feedback, but only the cascode circuit with impedance converter, i.e. the fan-in circuit. However, high demands are placed on the impedance converter in terms of accuracy, which is why it is to be properly calibrated. The conversion of the voltage of the integration capacitance into currents is realized by means of two transconductance amplifiers with unipolar output, each having dual current outputs, one of which is fed to resistors and used for voltage feedback (wherein in FIG. 4 only the single-ended realization of the circuit is illustrated). The second output is routed to the crossbar switches, i.e. the switches of the crossbars. Because the transconductance amplifiers are doubled to generate a fully differential output current, the transconductance amplifiers do not require their own common-mode regulation, but the common-mode potential of the differential integration capacitance must be regulated to the common-mode reference potential with a separate transconductance amplifier (wherein in FIG. 4 this transconductance amplifier for common-mode regulation is not illustrated).

The voltage mode (operation) has an advantage for fan-out. This is because a voltage can be distributed as widely as desired. Yet, the voltage mode (operation) has a disadvantage for fan-in. This is because a correspondingly high number of input resistors (corresponding to the required fan-in) must be provided, which might not be used, thus resulting in circuit overhead. However, the overhead for the resistors is not high. Another problem is that the crossbar switch, i.e. the switch of the crossbar at the input, is in series to the resistor, which causes a systematic error due to the voltage drop across the switch.

The current mode (operation) has an advantage for fan-in. This is because a subsequent analog function, i.e. its input, can be easily connected to several fan-outs of preceding analog functions. Yet, the current mode (operation) has a disadvantage for fan-out. This is because use of current mirrors in the fan-out circuitry is required (instead of resistors at the summation point of an integrator or an adder). In view thereof, complexity is increased, since a multiplying current-steering DAC, which is required to calibrate the offset (i.e. compensate the offset error) of the fan-out circuitry, is much more complex than discrete or digital potentiometers, which would be sufficient for trimming or representing resistors.

Figure 10:
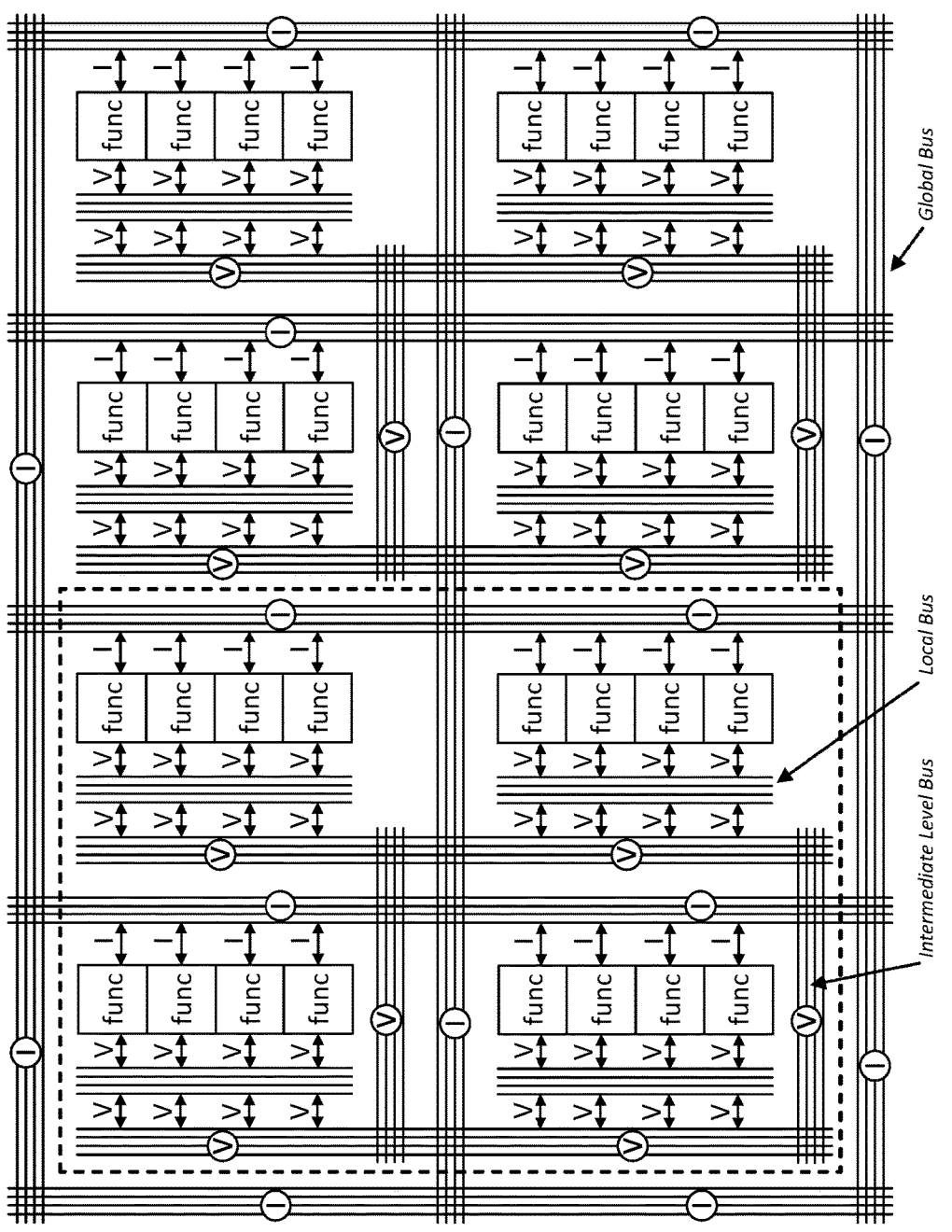
FIG. 10 shows a schematic diagram illustrating an example of a configuration for local, global and intermediate routing in an analog circuit according to an embodiment.
Figure 11:
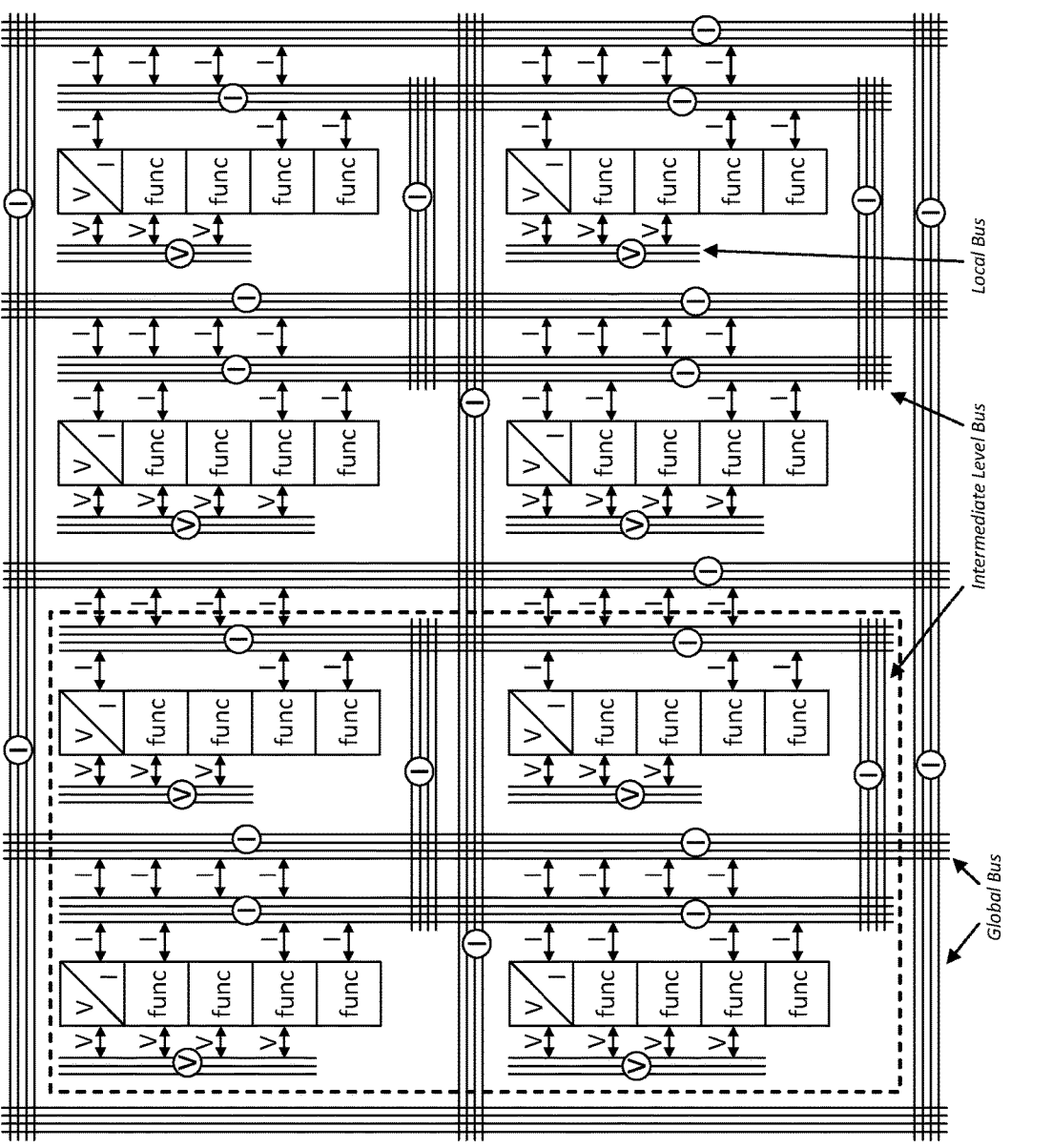
FIG. 11 shows a schematic diagram illustrating an example of a configuration for local, global and intermediate routing in an analog circuit according to an embodiment.

With reference to FIGS. 10 and 11, various examples and embodiments regarding an analog circuit comprising three hierarchy levels of interconnections, namely a local-bus hierarchy level, a global-bus hierarchy level and an intermediate-bus hierarchy level, are disclosed.

According to the embodiments of FIGS. 10 and 11, in addition to the local-bus hierarchy level and the global-bus hierarchy level (which may be configured as explained above), the interconnection structure comprises an intermediate-bus hierarchy level of interconnections. The intermediate-bus hierarchy level is configured to interconnect analog functions of a set of groups among the plurality of groups, and comprises voltage signal lines for transferring voltage signals and/or current signal lines for transferring current signals.

FIG. 10 shows a schematic diagram illustrating an example of a configuration for local, global and intermediate routing in an analog circuit according to an embodiment.

As shown in FIG. 10, the analog circuit according to the embodiment has a structure/configuration in which, besides local buses for each group and at least one global bus, a set (or cluster) of groups of analog functions share an intermediate-level bus (or, stated in other words, intermediate bus), which is configured to interconnect the analog functions of this set (or cluster). In FIG. 10, a dashed line box indicates one such set (or cluster) of analog functions sharing an intermediate-level bus, i.e. the 2×2 analog function groups on the left-hand side.

As a matter of course, the number and/or arrangements of analog function groups constituting a set/cluster is not limited accordingly, but an arbitrary number of analog function groups, which are located in mutual vicinity (e.g. adjacent or close to each other) can constitute a set/cluster. Also, the analog circuit may comprise sets/clusters with the same or different structures/configurations.

According to the embodiment, the local bus for each group comprises voltage signal lines for transferring voltage signals, i.e. lines (dedicated) for carrying voltage(-based) signals or simply voltages, as is denoted by "V" on connections to respective buses/lines, and the at least one global bus comprises current signal lines for transferring current signals, i.e. lines (dedicated) for carrying current(-based) signals or simply currents, as is denoted by "I" on respective buses/lines. Further, the intermediate-level bus of each set/cluster comprises voltage signal lines for transferring voltage signals, i.e. lines (dedicated) for carrying voltage(-based) signals or simply voltages, as is denoted by "V" on respective buses/lines.

In FIG. 10, the signal transfer between the local voltage buses and the intermediate-level voltage bus is represented by lines with arrow (being denoted by "V"). Such connection can be realized by corresponding switches between these buses. Further, it is deemed to be self-evident that connections at the crossbars are connecting vertical current bus (lines) with horizontal current bus (lines) and vertical voltage bus (lines) with horizontal voltage bus (lines). At the crossing of the intermediate-level voltage bus and the global current bus, there are no crossbar switches (allowed), but crossbar switches are only present (allowed) between crossing voltage lines and/or crossing current lines (i.e. buses of the same electrical type).

Although not shown in FIG. 10, at least some analog functions may also be directed connected to the intermediate-level voltage bus, without (in-between) connection via the local voltage bus (as is exemplarily shown).

FIG. 11 shows a schematic diagram illustrating an example of a configuration for local, global and intermediate routing in an analog circuit according to an embodiment.

As shown in FIG. 11, the analog circuit according to the embodiment has the same basic structure/configuration as shown in FIG. 10. Hence, reference is made to the description of FIG. 10 for the basic structure/configuration, while the difference is described below.

According to the embodiment, the local bus for each group comprises voltage signal lines for transferring voltage signals, i.e. lines (dedicated) for carrying voltage(-based) signals or simply voltages, as is denoted by "V" on respective buses/lines, and the at least one global bus comprises current signal lines for transferring current signals, i.e. lines (dedicated) for carrying current(-based) signals or simply currents, as is denoted by "I" on respective buses/lines. Further, the intermediate-level bus of each set/cluster comprises current signal lines for transferring current signals, i.e. lines (dedicated) for carrying current(-based) signals or simply currents, as is denoted by "I" on respective buses/lines.

It is deemed to be self-evident that connections at the crossbars are connecting vertical current bus (lines) with horizontal current bus (lines).

In FIG. 11, the signal transfer between the intermediate-level current bus and the global current bus is represented by lines with arrow (being denoted by "I"). Such connection can be realized by corresponding switches between these buses, or can be realized by crossbar switches where the intermediate-level current bus crosses the global current bus (as these buses are of the same electrical type).

Although not shown in FIG. 11, at least some analog functions may also be directed connected to the global current bus, without (in-between) connection via the intermediate-level current bus (as is exemplarily shown).

Generally, it is to be noted that the structures/configurations shown in FIGS. 10 and 11 are for illustrative purposes only, without being limiting accordingly. For example, any connection between respective analog functions and one or more of local, intermediate-level and global buses is applicable, any arrangement of analog functions within respective groups is applicable, any arrangement of sets or clusters is applicable, and all variants as described above (with respect to FIGS. 5 to 9) are applicable, respectively. For example, one or more of local, intermediate-level and global buses may comprise a combination/mixture of one or more lines (dedicated) for carrying current(-based) signals or simply currents and one or more lines (dedicated) for carrying voltage(-based) signals or simply voltages, respectively.

As regards the usage of a (combination of) different (types of) signals, namely voltage and current signals, for local, global and intermediate routing, the above explanations with regard to (the combination) local and global routing are equally applicable accordingly.

While FIGS. 10 and 11 show analog circuit comprising three hierarchy levels of interconnections, it is to be noted that any number of hierarchy levels is applicable. Namely, an analog circuit according to an embodiment may have four or more hierarchy levels of interconnections, namely a local-bus hierarchy level, a global-bus hierarchy level and an arbitrary number of intermediate-bus hierarchy levels. If so, each intermediate-bus hierarchy level is configured to interconnect analog functions of different sets (or clusters) of groups of analog functions. For example, referring to the exemplary structures/configurations of FIGS. 10 and 11, the illustrated intermediate-level buses may represent a third hierarchy level (for a set/cluster of 2×2 analog function groups), and a fourth hierarchy level (for a set/cluster of 4×2 analog function groups), such that the two sets/clusters of the third hierarchy level in the embodiments of FIGS. 10 and 11 constitute another set/cluster of the fourth hierarchy level. For any such further hierarchy level, the above explanations for the third hierarchy level apply accordingly.

Although FIGS. 10 and 11 exemplarily show a single intermediate-level bus for each set/cluster, the intermediate-bus hierarchy level may comprise more than one intermediate-level bus for at least one set/cluster. For example, the intermediate-bus hierarchy level may comprise at least a first intermediate-level bus for a first set (or cluster) of groups, and a second intermediate-level bus for a second set (or cluster) of groups. If so, for example, the first set (or cluster) of groups may comprise a smaller number of groups and/or groups which are located more adjacent or closer to each other as compared with the second set of groups, and the first intermediate-level bus may be configured to transfer voltage signals by/via one or more voltage signal lines, and the second intermediate-level bus may be configured to transfer current signals by/via one or more current signal lines.

According to the present disclosure, an efficient and compact analog circuit architecture can be provided by combining the advantages of the voltage and current modes and eliminating the fan-in/fan-out problems.

In the regard, one or more of the following points can be employed according to various embodiments.

An integrator can provide current and voltage input at the same time, and a current input requires only another switch at the summation point, wherein the on-resistance of the switch is not critical.

The integration can be carried out with classic OpAmp-based integrators so that a buffered voltage is available at the output. A disadvantage of direct current injection in OpAmp-based integrators or adders is that the summation point of the input is connected to the signal bus. Here, interference can be reduced by fully differential circuitry or, if necessary, by a first order low-pass filter in the input signal line, whose corner frequency is below the second pole frequency of the integrator.

The fan-out circuitry of the integrator, which is required for the current mode, can be omitted. This is beneficial, since the compensation of offset errors is complex and gain errors can hardly be compensated at all.

If a fan-out greater than 1 is required, i.e. two or more outputs are required, this can be accomplished in various ways. On the one hand, the voltage mode of one or more subsequent analog functions, such as integrators or adders, can be used, since the voltage output is capable of providing any fan-out. On the other hand, if the current mode of one or more subsequent analog functions, such as integrators or adders, is to be used, i.e. currents have to be conducted via a corresponding signal line or bus, several voltage-to-current conversion circuits (V-I converters), each with a fan-out of 1, can be used in parallel (and each of these can be connected to a current fan-in of one or more subsequent analog functions).

If the on-resistance of a switch is critical with voltage fan-in, calibration can be performed by feeding a reference signal once with positive sign via the path with the resistor and the switch and once with negative sign as a current via a switch into the integrator or adder and adjusting the result of the adder or integrator to zero. The adjustment can be done by designing a part of the resistor as a (digital) potentiometer and thus reducing the regular resistance to such an extent that the reduced resistance together with the on-resistance of the switch corresponds to the nominal desired resistance.

The fan-out circuitry of an analog function, such as an integrator or an adder, can be omitted, which would be required for current mode (operation). Thereby, both gain and offset errors can be compensated based on (digital) potentiometers without the need for complex current-steering DACs.

The voltage mode can be (preferably or primarily) used for local routing to neighboring functions or elements, when the connection is made over the shortest possible lines and direct connections.

The current mode can be (preferably or primarily) used for global routing, i.e. when the routing goes to remote functions or elements, passing through several switches of crossbar distributors.

Voltage and current modes can be combined in/for fan-out, e.g. by directly driving a neighboring function or element with voltage and by transferring the signal as current by means of a V-I converter to a remote function or element.

One or more V-I converters or I-V converters can be used, e.g. in one or more groups. Thereby, the problem that in signal distribution by means of currents there is actually no simple way to fine-adjust coefficients can be eliminated, since the reference resistor in a converter can be implemented with a digital potentiometer that permits fine adjustment.

According to various embodiments of the present invention, for implementation of an integrator in an analog circuit, a simplified and more efficient circuit structure can be adopted. For example, a circuit structure as shown in FIG. 9 can be adopted instead of that shown in FIG. 4. Namely, as explained above, a fan-out circuitry can be omitted, a classic OpAmp-based implementation can be utilized, a most appropriate fan-in concept can be applied, and the like.

In the foregoing, a description of the structural and functional properties of analog circuits according to various embodiments are described. It is to be noted that the foregoing description is to be construed as a disclosure of the analog circuits as such, i.e. the respective structures/configurations or components, as well as a disclosure of the operation methods of the analog circuits (i.e. the method of operating the analog circuits), i.e. their operations and functions when operated. Namely, when the foregoing description refers to some interconnections or signal transfer (or routing), this equally relates to the corresponding structural and functional aspects, respectively. For example, when a signal transfer from one analog function to another analog function is mentioned, this encompasses both the structural connection by way of signal lines, switches, etc. and the functional operation, including a corresponding driving of analog functions involved, a corresponding switching of switches on the required path, and the like.

Hereinafter, a design method for analog circuit, i.e. a method of/for designing an analog circuit, is described.

Basically, a design method according to the present disclosure is any method or process of designing an analog circuit such that a corresponding structure/configuration results, e.g. as illustrated in any one of FIGS. 5 to 11. Such design method may also be regarded as a method or process of designing an analog circuit such that a desired/intended purpose is achieved, e.g. a specific mathematical problem is solved or a mathematical task is implemented on an analog computer.

Figure 12:
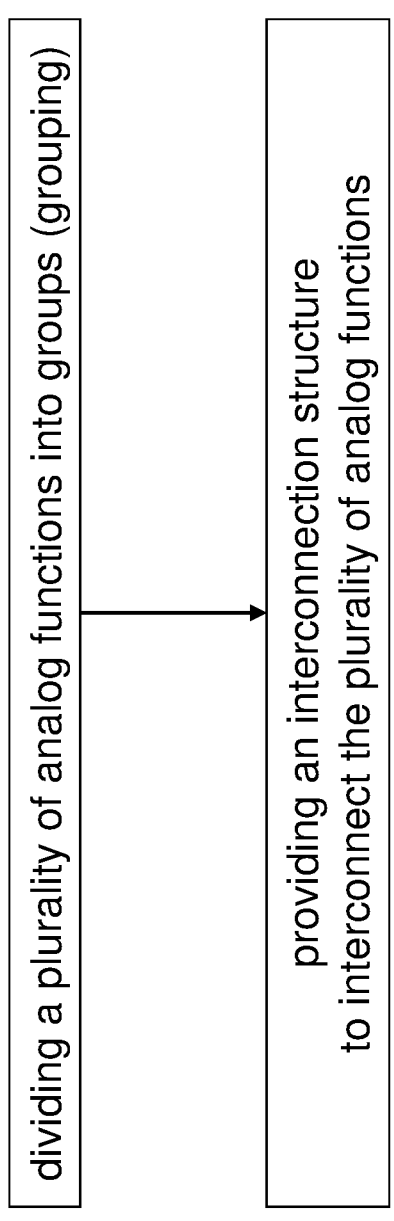
FIG. 12 shows a flowchart illustrating an example of a method for designing an analog circuit according to an embodiment.

FIG. 12 shows a flowchart illustrating an example of a method for designing an analog circuit according to an embodiment. The resulting analog circuit can have a structure/configuration, as shown e.g. in any one of FIGS. 5 to 11.

As shown in FIG. 10, the design method according to the embodiment comprises a step of dividing a plurality of analog functions into groups, i.e. grouping a plurality of analog functions, and a step of providing an interconnection structure configured to interconnect the plurality of analog functions, wherein the interconnection structure comprises at least two hierarchy levels of interconnections, namely a local-bus hierarchy level configured to interconnect analog functions of a respective group (or, stated in other words, enable local routing of signals between analog functions of the respective group) and a global-bus hierarchy level configured to interconnect analog functions of the plurality of groups (or, stated in other words, enabling global routing of signals between analog functions of the plurality groups), as explained above. Namely, corresponding signal lines, connections and/or switches can be provided such that a current input or output of an analog function can be connected to a corresponding current signal line, and/or a voltage input or output of an analog function can be connected to a corresponding voltage signal line.

In the dividing/grouping step, a set of required analog functions can be decided or set. That is, the plurality of analog functions to be implemented can be determined (e.g. in view of the mathematical problem to be solved).

Also, in the dividing/grouping step, the plurality of analog functions (or groups thereof) may additionally be divided into sets or clusters, and the interconnection structure providing step may provide an interconnection structure with at least one further hierarchy level, including at least one intermediate-bus hierarchy level configured to interconnect analog functions of a set of groups among the plurality of groups (or, stated in other words, enabling intermediate(-level) routing of signals), as explained above.

FIG. 13 shows a flowchart illustrating an example of a method for designing an analog circuit according to an embodiment. The resulting analog circuit can have a structure/configuration with two hierarchy levels of interconnections, as shown e.g. in any one of FIGS. 5 to 9.

As shown in FIG. 11, the design method according to the embodiment comprises a first step in which the mathematical problem/task is decomposed, i.e. the systems of equations are sorted, in such a way that as many interconnections as possible occur within a group of analog functions, and fewer interconnections occur between the different groups. Hence, a grouping is effective, which is optimized (e.g. maximized) in terms of the resulting number or lengths of signal lines and/or routing requirements, or the like. In a second step, the inputs and outputs of the analog functions of a group are connected to the respective local bus with voltage signals (and, in the case shown in FIG. 7, also to the respective local bus with current signals), as appropriate. If the fan-in at one point, i.e. one or more analog functions, is not sufficient, one or more additional voltage-current converters and/or current-voltage converters are used and implemented in the group in a third step. In a fourth step, the output of any voltage-current converter as well as the outputs of analog functions that are only available as current are routed via the global bus as current signals. Optionally, in the case shown in FIG. 8, the output of any current-voltage converter as well as the outputs of analog functions that are only available as voltage are routed via the global bus as voltage signals.

A similar method for designing an analog circuit according to an embodiment applies for an analog circuit which can have a structure/configuration with three or more hierarchy levels of interconnections, as shown e.g. in any one of FIGS. 10 and 11.

In the foregoing, various examples and embodiments for realizing an analog circuit (as well as an operating method and/or design method of an analog circuit) which provides for an efficient interconnection of or signal transfer (or routing) between a plurality of analog functions are disclosed. The thus disclosed examples and embodiments are for illustrative purposes, without limiting the present disclosure.

The present disclosure also covers any conceivable combination of structural or functional elements described above, as long as the above-described concepts of methodology and structural arrangement are applicable.

By virtue of various examples and embodiments of the present disclosure, as evident from the above, a technique is presented, which allows an efficient interconnection of analog functions of an analog circuit such as e.g. an analog computer. The interconnection is structured hierarchically. On a first/lower hierarchy level voltages are (preferably) used for signal transfer, i.e. local routing, and on a second/higher hierarchy level currents are (preferably) used for signal transfer, i.e. global routing, to interconnect the analog functions. With this technique, the advantages of the respective signal transmissions by voltages or currents can be enhanced or optimized, respective limitations for fan-in and/or fan-out can be bypassed or at least suppressed, and the effort and thus the space consumption for the interconnection are minimized overall.

In view of the above, there is provided an analog circuit comprising: a plurality of analog functions, which are divided into at least two groups of analog functions, and an interconnection structure configured to interconnect the plurality of analog functions so as to enable transfer of both voltage and current signals between analog functions among the plurality of analog functions. The interconnection structure comprises at least two hierarchy levels of interconnections, wherein a local-bus hierarchy level is configured to interconnect analog functions of a respective group, and a global-bus hierarchy level is configured to interconnect analog functions of the plurality of groups. The local-bus hierarchy level comprises voltage signal lines for transferring voltage signals and/or current signal lines for transferring current signals, and the global-bus hierarchy level comprises voltage signal lines for transferring voltage signals and/or current signal lines for transferring current signals.

Even though the present disclosure is described above with reference to the examples according to the accompanying drawings, it is to be understood that the present disclosure is not restricted thereto. Rather, it is apparent to those skilled in the art that the present disclosure can be modified in many ways without departing from the scope of the inventive idea as disclosed herein.

The invention claimed is:

1. An analog circuit comprising:
a plurality of analog functions, which are divided into at least two groups of analog functions; and
an interconnection structure configured to interconnect the plurality of analog functions so as to enable transfer of both voltage and current signals between analog functions among the plurality of analog functions, wherein
the interconnection structure comprises at least two hierarchy levels of interconnections, wherein
a local-bus hierarchy level is configured to interconnect analog functions of a respective group, and
a global-bus hierarchy level is configured to interconnect analog functions of the plurality of groups,
the local-bus hierarchy level comprises voltage signal lines for transferring voltage signals and/or current signal lines for transferring current signals, and
the global-bus hierarchy level comprises voltage signal lines for transferring voltage signals and/or current signal lines for transferring current signals, wherein
the local-bus hierarchy level comprises, for at least one group, at least
a first local bus, which is configured to interconnect a set of analog functions of the respective group, and
a second local bus, which is configured to interconnect another set of analog functions of the respective group, wherein
the first local bus comprises voltage signal lines for transferring voltage signals,
the second local bus comprises current signal lines for transferring current signals, and
the interconnection structure comprises at least a further hierarchy level of interconnections, wherein
at least one intermediate-bus hierarchy level is configured to interconnect analog functions of a set of groups among the plurality of groups, and
the at least one intermediate-bus hierarchy level comprises voltage signal lines for transferring voltage signals and/or current signal lines for transferring current signals.

2. The analog circuit according to claim 1, wherein
the local-bus hierarchy level comprises at least one local bus for each group, which is configured to interconnect analog functions of the respective group, and
the global-bus hierarchy level comprises at least one global bus, which is configured to interconnect analog functions of the plurality of groups.

3. The analog circuit according to claim 2, wherein
the at least one local bus for each group comprises voltage signal lines for transferring voltage signals, and
the at least one global bus comprises current signal lines for transferring current signals.

4. The analog circuit according to claim 3, wherein
the at least one local bus for at least one group further comprises current signal lines for transferring current signals, and/or
the at least one global bus further comprises voltage signal lines for transferring voltage signals.

5. The analog circuit according to claim 4, wherein
any analog function is connected to the local bus for its
  group and/or the at least one global bus.

6. The analog circuit according to claim 5, wherein
a current input or output of an analog function is con-
  nected to a current signal line, and/or
a voltage input or output of an analog function is con-
  nected to a voltage signal line, and/or
a first analog function in a group, which is connected to
  a voltage signal line, and a second analog function in
  the group, which is connected to a current signal line,
  are interconnected via a voltage-current converter or a
  current-voltage converter as a third analog function in
  the group.

7. The analog circuit according to claim 1, wherein at least
one group comprises voltage-current converters as analog
functions, which are configured to
    extend a fan-in property of an analog function in that
      current outputs of at least two voltage-current convert-
      ers, the voltage inputs of which are connected to
      different voltage signal lines, are connected to a current
      signal line which is connected with a current input of
      the analog function, and/or
    extend a fan-out property of an analog function in that a
      voltage output of the analog function is connected to a
      voltage signal line which is connected to voltage inputs
      of at least two voltage-current converters, the current
      outputs of which are connected to different current
      signal lines.

8. The analog circuit according to claim 1, wherein at least
one group comprises one or more voltage-current converters
as analog functions, which are configured to
    extend a signal bandwidth and/or reduce influence of
      parasitic resistance in signal transfer in that one or more
      voltage signals are converted into one or more current
      signals and the one or more current signals are trans-
      ferred via at least one global bus between analog
      functions of different groups.

9. The analog circuit according to claim 1, wherein at least
one group comprises a voltage-current converter as analog
functions, which is configured to
    compensate gain and/or offset errors of an analog function
      in that one or more potentiometers of the voltage-
      current converter are adjusted to calibrate an output
      signal of the analog function, and/or
    compensate parasitic resistance at a voltage input of an
      analog function in that a calibrated current signal and
      the calibrated current signal with reversed sign are transferred to current inputs of the analog function and
  an output signal of the analog function is adjusted to
  zero.

10. The analog circuit according to claim 1, wherein
a respective set of groups comprises a number of groups,
  which are located adjacent or close to each other, and/or
the at least one intermediate-bus hierarchy level com-
  prises at least one intermediate bus for a set of groups,
  which is configured to interconnect analog functions of
  the respective set of groups.

11. The analog functions according to claim 10, wherein
the at least one intermediate-bus hierarchy level com-
  prises at least
    a first intermediate bus for a first set of groups; and
    a second intermediate bus for a second set of groups,
  wherein the first set of groups comprises a smaller number
    of groups and/or groups which are located more adja-
    cent or closer to each other as compared with the
    second set of groups, and
  the first intermediate bus comprises voltage signal lines
    for transferring voltage signals, and the second inter-
    mediate bus comprises current signal lines for trans-
    ferring current signals.

12. The analog circuit according to claim 1, wherein the
analog functions are divided into groups such that a number
of links between analog functions in a group is optimized,
wherein the plurality of analog functions constitutes a math-
ematical problem to be solved by the analog circuit, and/or
    any one of the analog functions is or comprises any one
      of an integrator, an adder, a multiplier, a voltage-current
      converter, a comparator, an exponential function, a
      logarithmic function, a configurable arbitrary function
      generator or a current-voltage converter and/or
    any one of the analog functions comprises a functional
      component configured to realize a respective function,
      without comprising fan-in and/or fan-out circuitry.

13. The analog circuit according to claim 1, wherein
the analog circuit is or is comprised in or is dedicated for
    any one of an analog computer, an analog arithmetic
    circuit, an analog filter or an analog signal conditioning
    system, or is comprised in or is dedicated for any one
    of a hybrid computer, a hybrid arithmetic circuit, a
    hybrid filter or a hybrid signal conditioning system,
    and/or
the analog circuit is implemented as any one of an
    integrated circuit, such as-a system-on-chip integration,
    a microchip or a microprocessor, or a discrete circuit.

* * * * *